United States Patent [19]
Inoue

[11] 3,873,805
[45] Mar. 25, 1975

[54] METHOD OF MAKING A HEAT EXCHANGER

[76] Inventor: Kiyoshi Inoue, 16-8 3-chome, Kamiyoga, Tokyo, Japan

[22] Filed: Nov. 29, 1973

[21] Appl. No.: 420,271

Related U.S. Application Data

[60] Division of Ser. No. 187,988, Oct. 12, 1971, Pat. No. 3,825,064, which is a continuation-in-part of Ser. No. 10,090, Feb. 16, 1970, Pat. No. 3,670,137, which is a continuation of Ser. No. 611,497, Nov. 30, 1966, abandoned, which is a division of Ser. No. 356,714, April 2, 1964, Pat. No. 3,340,052, which is a continuation-in-part of Ser. No. 247,387, Dec. 26, 1962, Pat. No. 3,250,892.

[30] Foreign Application Priority Data
Dec. 26, 1961  Japan................................ 36-47409

[52] U.S. Cl............... 219/149, 29/157.3 R, 29/420
[51] Int. Cl.................................................. B21j 1/06
[58] Field of Search........ 29/157.3 R, 420, DIG. 13; 219/149, 76, 152

[56] References Cited
UNITED STATES PATENTS

| | | | |
|---|---|---|---|
| 2,299,483 | 10/1942 | Lübbe et al.......................... | 219/76 |
| 2,393,036 | 1/1946 | Farr..................................... | 165/180 |
| 2,994,762 | 8/1961 | Todd..................................... | 219/76 |
| 3,047,712 | 7/1962 | Morris................................. | 219/107 |
| 3,095,255 | 6/1963 | Smith................................... | 165/180 |
| 3,201,858 | 8/1965 | Valyi................................. | 29/157.3 R |
| 3,248,917 | 5/1966 | Herring............................ | 29/421 E |
| 3,500,972 | 3/1970 | Talmage........................... | 29/420 X |
| 3,567,903 | 3/1971 | Parker............................... | 219/149 |

Primary Examiner—Richard J. Herbst
Assistant Examiner—D. C. Reiley, III
Attorney, Agent, or Firm—Karl F. Ross; Herbert Dubno

[57] ABSTRACT

A heat exchanger is formed by compacting metallic particles, especially of materials of high thermal conductivity to form the heat exchange surfaces, preferably against a substrate such as thermally conductive tube. The compaction involves electrical sintering, with the particle-particle interfaces and the particle-substrate interfaces metallurgically homogenized to form a monolithic structure free from corrosion sites.

12 Claims, 47 Drawing Figures

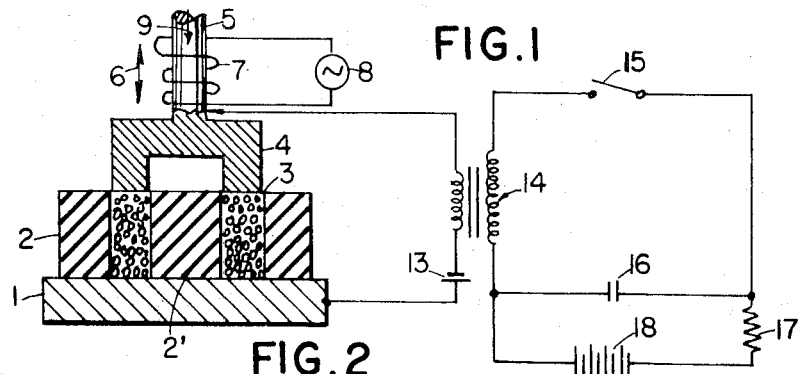
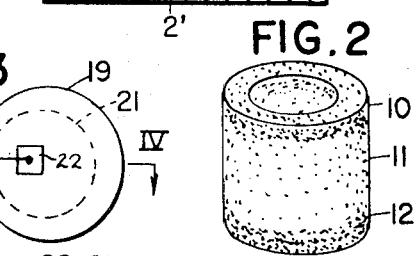
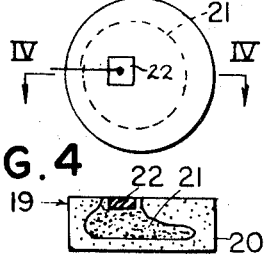
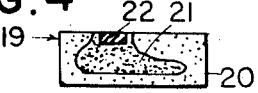
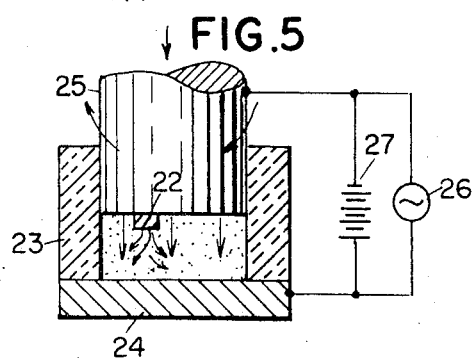
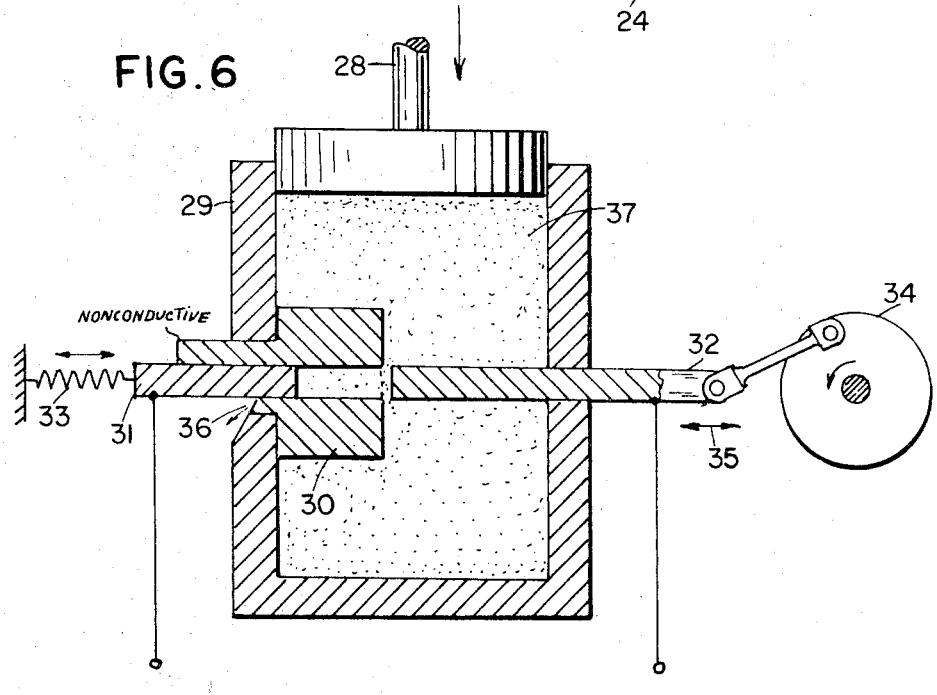

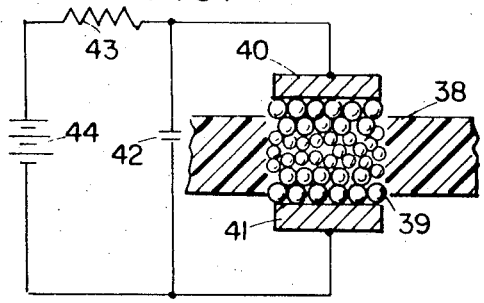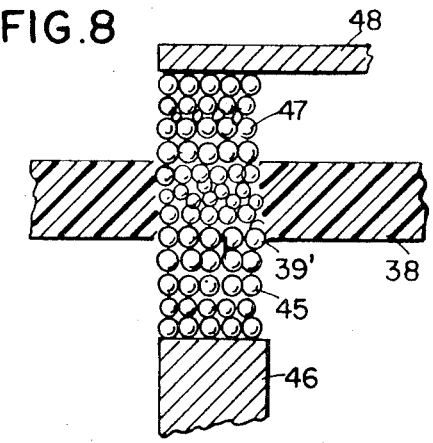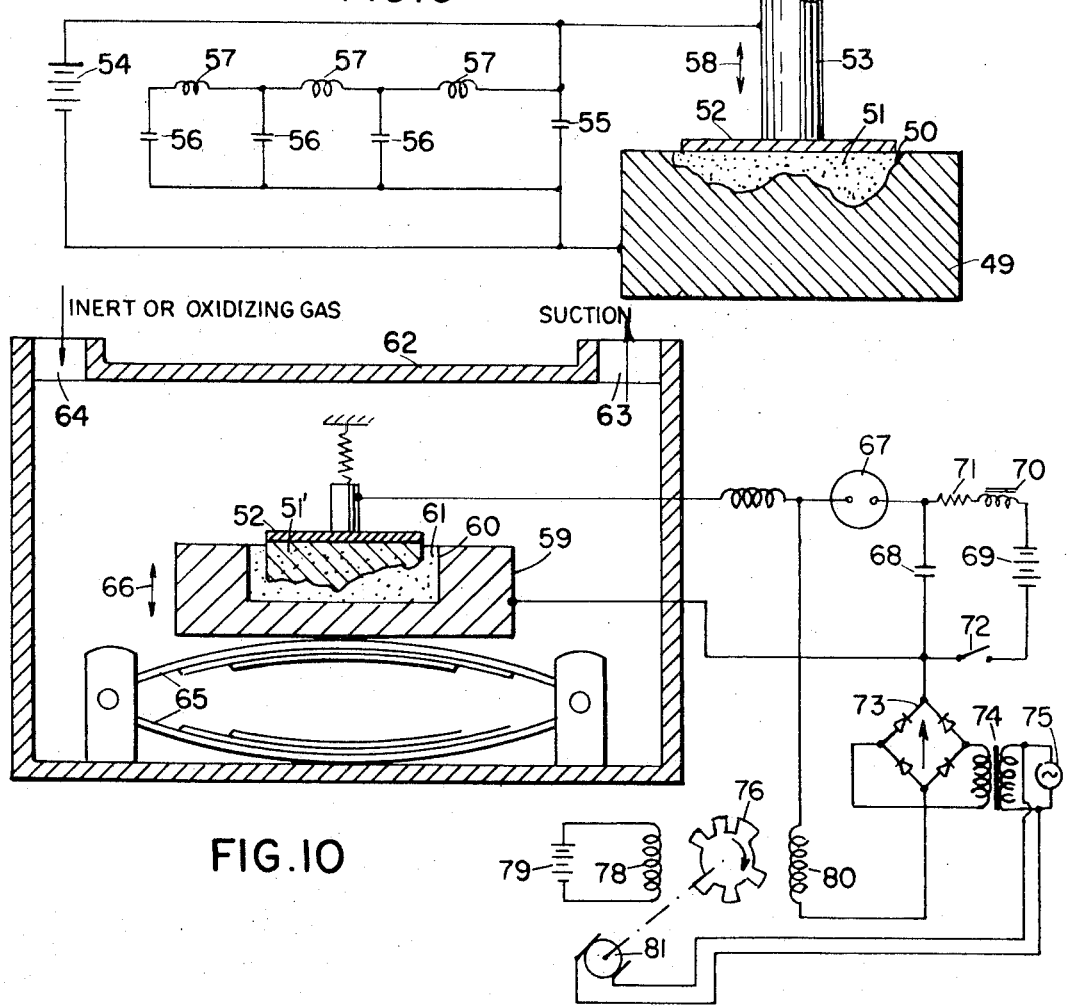

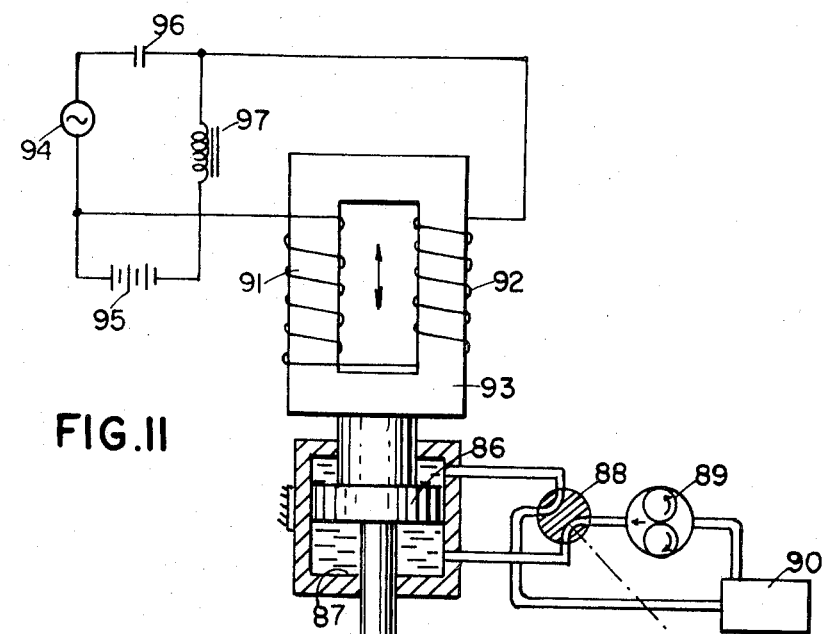
FIG.11
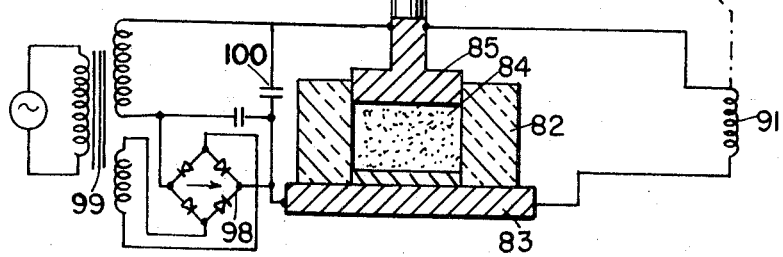
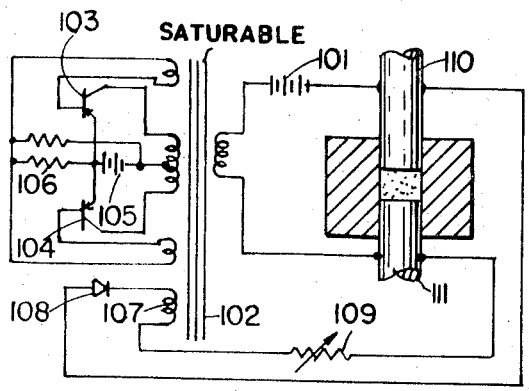
FIG.12
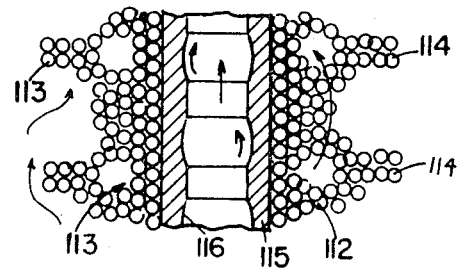
FIG.13
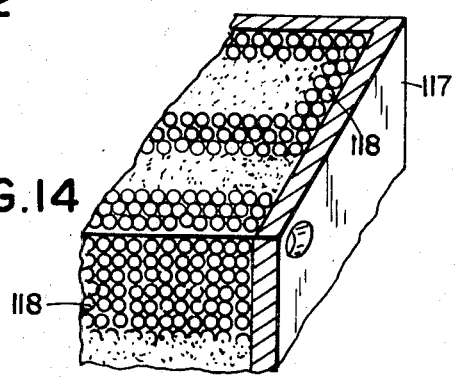
FIG.14

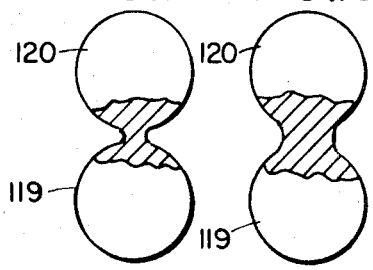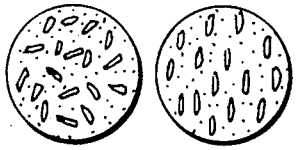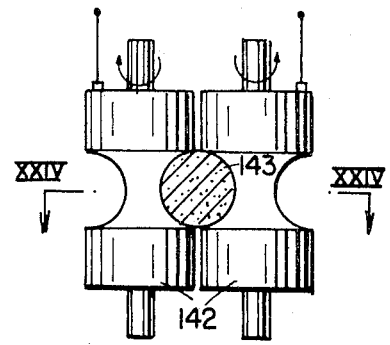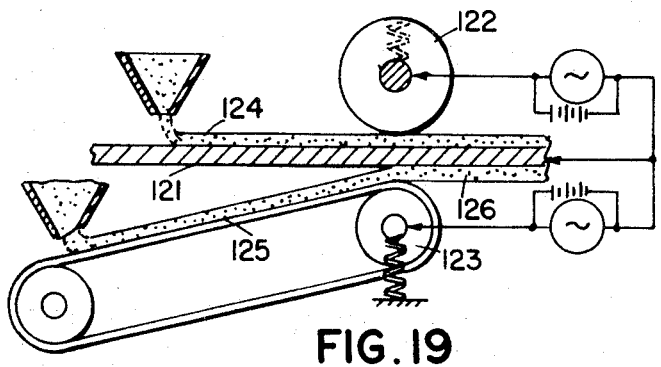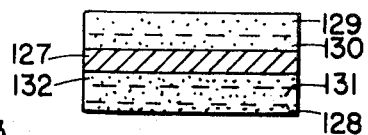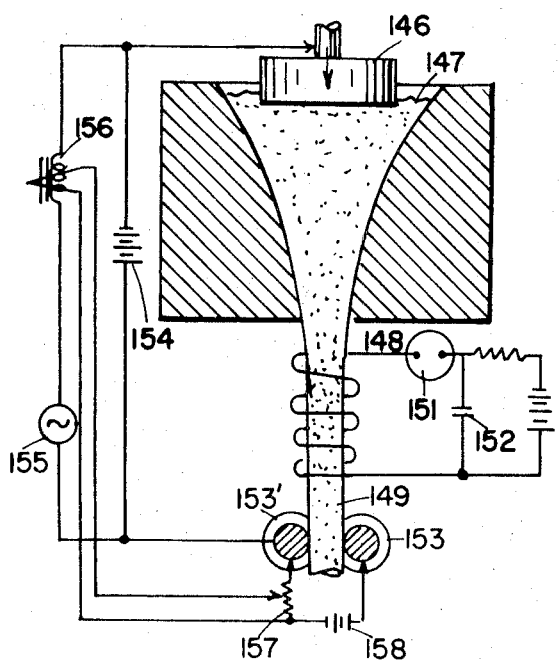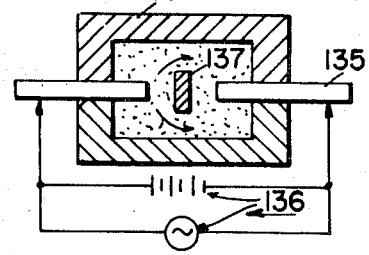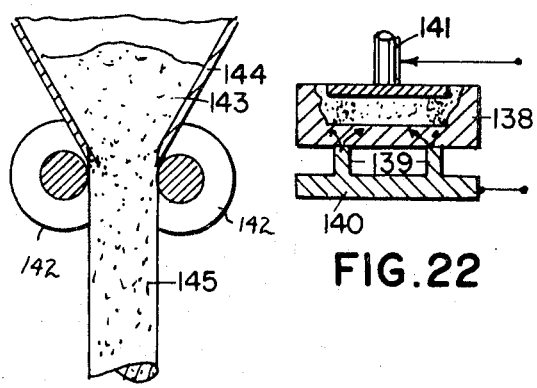

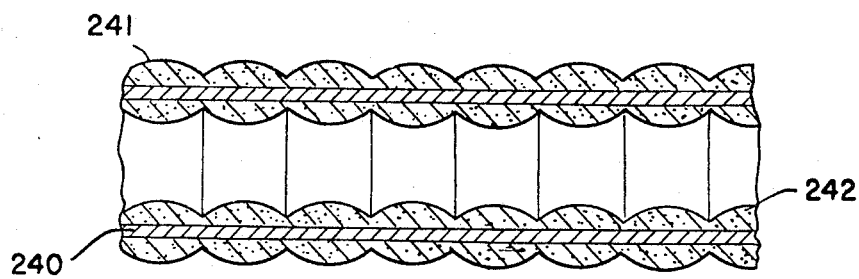
FIG. 26
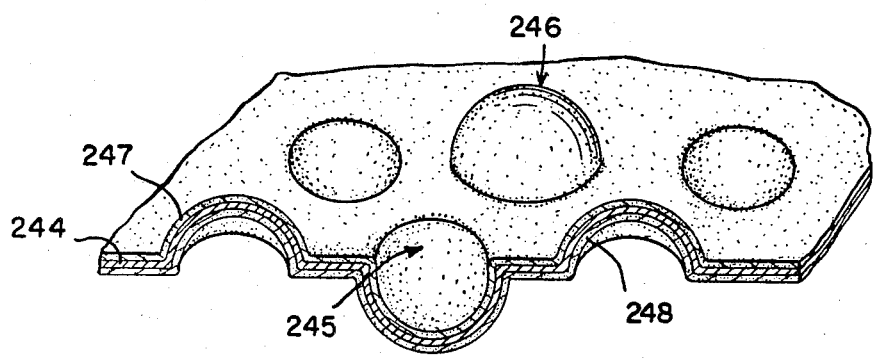
FIG. 27
FIG. 28
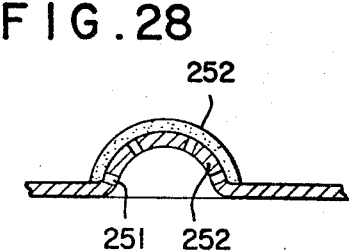
FIG. 30
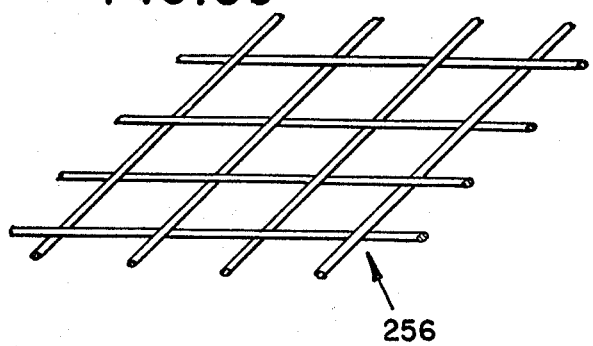
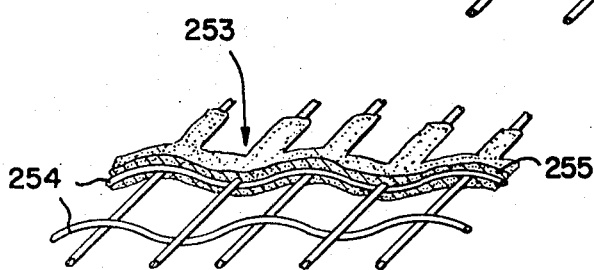
FIG. 29

METHOD OF MAKING A HEAT EXCHANGER

Cross-Reference to Copending Application

This is a division of application Ser. No. 187,988, filed 12 Oct. 1971, now U.S. Pat. No. 2,825,064.

The parent application is a continuation-in-part of my application Ser No. 10,090 filed 16 February 1970 (now Patent 3,670,137 issued June 13, 1972) as a continuation of application Ser. No. 611,497 filed 30 November 1966, now abandoned, as a division of its parent application Ser. No. 356,714 filed 2 April 1964 (now U.S. Pat. 3,340,052 issued 5 September 1967), as a continuation-in-part of then-pending application Ser. No. 247,387 filed 26 December 1962, now U.S. Patent No. 3,250,892 issued 10 May 1966.

FIELD OF THE INVENTION

The present invention relates to the sintering of discrete bodies or particles to form coherent objects and to the bonding of such bodies to substrates.

More particularly, this invention relates to a heat exchanger structure and to a method of making same using sintering techniques and, especially, electrical-sintering procedures.

BACKGROUND OF THE INVENTION

Earlier-known sintering techniques, which have found considerable utility in the field of powder metallurgy, in batteries, and in related arts can generally be classified in three categories, depending upon the specific procedure used. The principal known method of sintering involves the heating, usually in electric or gas furnaces but also by induction or dielectric processes, of the mass of particles which is subjected to extremely high pressure, generally on the order of tons/cm.$^2$ (1000 kg./cm.$^2$) to effect a welding of the particles together under the elevated pressure. The other conventional methods involve the use of lower pressures, also on the order of tons/cm.$^2$, but temperatures sufficiently high to cause considerable flowing of the particulate material, and the use of adhesives or fusion agents which permit the use of lower temperatures but nevertheless require pressures upwards of, say, 500 kg./cm.$^2$ It has also been proposed to employ resistance-heating techniques which also require elevated pressure. All of these methods are characterized by the disadvantage that uniform heating is all but impossible and necessitate recourse to expensive hydraulic or pneumatic presses to provide the elevated pressures.

In the production of articles in which a mass of particles is bonded to a substrate, I may mention that the primary problem is adhesion of the particle mass to the underlying surface. Since I first disclosed the production of heat exchangers by sintering a particulate mass to a continuous metal surface, numerous attempts have been made to overcome the disadvantages of conventional sintering. It should be noted that the basic structure of the improved heat exchanger comprised a continuous-metal body, usually a tube of a material of high thermal conductivity in which one of the fluids is conducted, sheathed in a layer of a material composed of particles and bonded to the tube. The particulate mass, which is coherent, porous and contoured to provide a large effective surface area or volume, generally is traversed by a second heat exchange fluid, liquid or gas, adapted to penetrate into the interstices of the particulate-metal body.

One of the major problems arising with such structures, especially when made by conventional techniques, is that the adhesion or bonding strength of the particulate mass to the substrate is poor unless the particulate mass has been highly compacted. The high compaction pressures reduce porosity and the heat-transfer coefficient through the duct. Even more significant, however, is the fact that the particulate mass has a different coefficient of thermal expansion and contraction from that of the substrate tube, even when the latter is composed of essentially the same metal. Since different parts of a heat exchanger are often exposed to high and/or variable temperature differentials the thermally induced stresses are considerable and inadequate bonding strength tends to result in early deterioration of the unit.

Furthermore, conventional methods of making heat-exchange surfaces of a high coefficent of heat transfer are time consuming, expensive and, frequently, unreliable for producing standardized units with coefficients and characteristics in a limited tolerance range.

Finally, I may mention a major problem which has arisen in the heat-exchanger field in attempts, by conventional sintering, soldering and other techniques, to affix the members forming the surfaces contacting the respective fluids together. At the interface or junction, corrosion of the stress-cracking type (resulting from the stress mentioned above) or of the electrolytic type (resulting from the almost inevitable formation of contact potentials at the interface) frequently is rampant. Conventional bonding techniques and even the use of the same materials for both members, are unable to avoid such corrosion.

OBJECTS OF THE INVENTION

It is the principal object of the invention to provide an improved method of sintering discrete electrically fusible bodies together without the use of elevated pressures.

It is a corollary object of the invention to provide a method of forming sintered-metal objects having improved properties not hitherto attainable with known techniques.

Yet another object is to improve the fatigue resistance, frictional characteristics, toughness, tensile strength, wear resistance, corrosion resistance and related properties of metal objects by sintering a surface layer thereto without the use of pressures and heating techniques which would adversely affect these properties.

Another object of the invention is to provide a method of simultaneously sinter-forming and molecularly orienting bodies composed of discrete particles.

It is another object of the invention to provide an improved heat-exchanger structure adapted to obviate the aforementioned drawbacks.

Another object of the invention resides in the provision of a heat-exchanger structure which is inexpensive to produce, has improved adhesion of a sintered-particle mass to a substrate, is less sensitive to temperature variation and differentials, and is less susceptible to corrosion by comparison with prior-art arrangements.

It is yet a further object of the invention to provide an improved method of making a heat exchanger of the last-described type.

SUMMARY OF THE INVENTION

The above and other objects, which will become apparent hereinafter, are attained in accordance with the invention in part, by a method of sintering together a plurality of discrete bodies, comprising the steps of disposed the bodies in relatively light contacting relationship (i.e., under a mechanically applied pressure up to about 100 kg./cm.$^2$ but as low as the gravitational force urging some of the particles against others) and effecting a spark discharge between the bodies.

This aspect of the invention is based upon the totally surprising discovery that, contrary to the weight of earlier beliefs that elevated pressures are required to carry out an effective sintering operation, relatively low mechanical pressures can be employed when spark discharge is used. The electric spark, which advantageously possesses a power on the order of hundreds and even thousands of joules, forces the articles into bonding contact with a pressure even greater than that attainable heretofore by mechanical means even when the particles are in relatively light contact. In fact, such light contact is necessary to the development of the necessary spark which also provides sufficient heat to cause the particles to bond together with great strength. It should be noted that earlier resistance-heating techniques contrast sharply with the present method in that the earlier processes required that the pressure applied to the mass of particles be sufficient to reduce the contact resistance to a level substantially equal to the internal resistance of the particles so that a high current could be passed through the mass to develop the necessary bonding heat. In contradistinction thereto, the present method requires that the contact resistance be greater than the internal resistance and, preferably, several times as great so that, at least during initial stages of the sintering operation, most of the applied energy is in the form of the spark discharge with relatively little being dissipated in resistance heating of the particles. Since the sintering action occurs immediately upon the spark discharge, the completed body can be formed in a matter of seconds as compared with earlier methods requiring tens of minutes and even hours to effect complete sintering.

According to a more specific feature of the invention, a mass of discrete electrically fusible particles, preferably consisting predominantly of conductive metallic bodies, is disposed between a pair of electrodes which sustains the spark discharge. Since this mass naturally tends to shrink as sintering proceeds, means should be provided to maintain the electrodes in contact with the mass. To this end, the electrode means may be spring or gravity loaded or some positive drive means may be provided for maintaing the contact and, if desired, providing a mechanical pressure up to, say 100 kg./cm.$^2$ when required. The spark discharge may be terminated upon the particles being welded together, at least preliminarily, while passage of the electric current may be continued without development of the spark to weld the particles further by resistance heating.

The mass of conductive particles may be admixed with up to 20% by weight of nonconductive particles (e.g. of a synthetic resin) which constitute a filler adapted to improve the properties of the sintered body. The filler may be designed to reduce the weight, decrease the coefficient of friction, provide voids by volatilization upon firing or the like. When a synthetic-resin filler is employed, it is desirable to choose a material which can withstand elevated temperatures and yet is thermally fusible to a certain degree so that a bond is formed between the conductive and nonconductive particles. Suitable admixes thus may be polyamides, polyesters and phenolic resins.

It is possible, according to the invention, to bond the conductive particles to continuous metal bodies. The latter may then be formed as electrodes or disposed in the particle mass in contact with the electrodes so that a firm fusion bond is produced at the interface; the continuous body, which need not be of metal, may also be imbedded in the mass of particles and physically locked within the coherent structure. Since the coherent structure may be more or less porous as required, this method has particular application in the electrochemical field wherein the unit can act as an electrode with the continuous member serving as a terminal. Advantageously, the continuous member may serve as a support for a contoured sintered body in the form of a die for electrochemical or electric-discharge machining, stamping, pressing or hot forming of objects. Moreover, the sintered particles can, according to another feature of the invention, serve to increase fatigue resistance, tensile strength and other desirable characteristics of a metallic body or to constitute a corrosion-resistant layer therefor. The particles may, consequently, be composed of a stainless steel (e.g. ferrochrome) or another material capable of resisting electrolytic action.

It is desirable to superimpose a periodic current upon a direct current applied across the spark-discharge electrodes to avoid a preheating effect. The periodic current (e.g. an alternating current of less intensity than the direct current) may be terminated upon cessation of the spark discharge so that only a unidirectional field is applied to the sintered body. The periodic current can derive from a capacitor bridged across he electrodes or from some other alternating-current source. Advantageously, the capacitor works into a resistor which may be the ohmic impedance of the spark gap or the conductors connecting the source with the electrodes, to provide a time constant which varies as sintering proceeds and eventually results in complete elimination of the periodic current. It has been discovered that such apparatus renders it possible to provide complete control of the density of the sintered articles since increased power and elevated electrical frequencies result in a greater compaction of the mass under the same mechanical pressures. It is contemplated, therefore to provide means responsive to the density of the body (e.g. by determining the voltage drop thereacross) for controllng the power source by varying the intensity or frequency of the spark discharge. It has also been discovered that it is possible to control the density of the sintered body by controlled vibration of the particle mass before and during the spark discharge and regulating, within narrow limits as defined by the upper pressure range, the mechanical pressure applied to the particles.

Yet another feature of the invention resides in the concentration of the electric current at certain regions of the particle mass so as selectively to increase the density of the sintered body in these regions. This concentration of current can be effected by disposing a conductive member within the mass, the conductive member having an internal resistance substantially less than the contact resistance of the particles. The current will thus preferentially pass through this member, which displaces particles having a resistance greater than its internal resistance, so that the member is both bonded firmly into the body and serves as the nucleus for a relatively dense core therein. This core, which is formed in situ, serves as a support for more porous outer regions and is particularly suited for use in electrochemical systems wherein the porosity of the body enables extremely high discharge rates. Alternatively, it is possible to concentrate the current density at certain regions of the sinterable mass by forming the electrodes so that there is a predetermined "shortest current path" through the region to be densified. It is also possible to effect densification by varying the intensity of the spark as it traverses the particle mass. Thus, if it is desired to produce an elongated porous body having relatively dense supporting extremities, the initial spark intensity may be three to four times that employed as the spark traverses the central portion of the mass. The spark intensity is again increased as the spark approaches the other extremity. In general, the spark will proceed from one electrode to the other as a consequence of the unidirectional basic electrical field applied across the electrodes although under certain circumstances a spark may proceed from each electrode toward the center. it is also contemplated to carry out the entire sintering operation with a single spark discharge in which case a space discharge between the electrodes is employed. To distribute the space discharge to peripheral portions of the mass, a nonconductive member may be disposed within the latter approximately midway between the electrodes. A dense region can also be obtained by disposing therein relatively small-sized particles while relatively large-sized particles are present elsewhere in the body.

The sintering operation can be carried out under any ambient atmosphere (e.g., oxidizing, inert or reducing, as desired) and even under liquid. In the latter case it is preferred that the liquid be a dielectric so as not to sustain the passage of the spark-dissipating electrical currents by electrolytic action. This method of sintering also permits the molecular orientation of the sintered body so that the latter can, in effect, constitute a single crystal in many instances. It should be noted that molecular orientation can only be achieved with the aid of a relatively strong unidirectional electromagnetic force field. This force field is in effect, present in the spark discharge and is maintained by the passage of unidirectional electric currents between the electrodes and through the mass. It has also been discovered that vibration of the mass and/or the electrodes during the spark discharge permits control of the crystal size and orientation.

The present method is also adaptable to continuous formation of sintered bodies. As mass of sinterable particles can be continuously passed through a spark gap formed between a pair of electrodes, one of which may be constituted by the coherent, previously sintered material. It is also possible to provide means for repeatedly removing sintered bodies from between the electrodes for the protection of the tablets, pellets or the like. During continous operation the die, mold and electrodes may be cooled by air or water to dissipate the heat developed. In many cases the sinterable particles may be contained in a mold under their own weight while the spark discharge is carried out between electrodes extending into or forming part of the mold. It should be understood, however, that the slight mechanical pressure required may derive from one or more electrodes which may be spring biased or urged against the particles by gravitational force.

I have discovered, most surprisingly, that substantially all systems for applying metal particles to a substrate, while leading to an improved heat-exchanger structure by comparison with conventional finned systems in which continuous metal bodies are affixed by soldering or the like to metal tubes, have been prone to certain difficulties endemic in the heat-exchanger art. For example, the particle-particle bond and the particle-substrate bond are frequently unsatisfactory to the point that thermal stress induces separation of the particle mass from the substrate or break-up of the particle mass. Additionally, many, if not all, particle-particle interfaces and particle-substrate interfaces present sites for corrosion which is promoted when corrosive fluids form the heat exchange media and/or variable temperatures are encountered.

This can be avoided, according to the invention, by homogenizing the system metallurgically and electrically. More specifically, the present invention comprises the electrical sintering of a particle mass to a substrate, concurrently with or prior to an electrical homogenization whereby the particle-particle bond and the particle-substrate bond is produced at sites which monolithically combine the material of the two members. I have discovered, most surprisingly that the application of a high-frequency electric current of the order of 1 to 10 MHz is capable of effecting such homogenization at current intensities of a level sufficient to effect resistance welding. In other words, I may fuse the particles to the substrate by the spark-sintering method previously described or by any other method and then apply a high frequency train of pulses at a frequency of 1 to 10 MHz to effect homogenization. Furthermore, where the particles are magnetically permeable, i.e. consist of a ferromagnetic material, I apply the high frequency current pulses together with a superimposed direct current for homogenization and I may use the high-frequency pulses along or in combination with direct current to effect the actual sintering. While I do not wish to be bound by any theory in this regard, I believe that the homogenization is accomplished by a skin effect heating of the particles and the substrate at their contact interfaces. Thus, when the particle mass is compacted around the substrate, and high-frequency pulses are applied, preferably of the order of 1 to 10 MHz and an amplitude of 0.1 to 100 kilo amperes, the resistive heating is most significant along the surfaces of the bodies and may even result in an intermelting at these localized areas while a total melting of the particles of substrate does not occur and the porosity is not adversely effected. For reasons which are not fully apparent, material of the contacting particles interdiffuses and material of the particles interdiffuses with material of the substrate so that a monolithic structure is created at the contact points. The electrical treatment may be accompanied by the application of mechanical or fluid pressure to densify the mass against the substrate if reduction of the porosity is desired.

Whereas prior-art systems for the sinter-bonding of particles to a substrate, generally using mechanical pressure and furnace-type heating, are characterized by poor bond strength, corrosion resistance and mechanical strength so that descaling treatments may damage these heat-exchange surfaces and thermal stress may produce cracking or sloughing of the particle layer, the electrical homogenization technique of the present invention avoids all of these problems and additionally provides reproducible control of the porosity which is difficult with the prior-art sytems.

The particles employed in accordance with the present invention to form the improved heat-exchanger structure are preferably of a spherical configuration of a selected size, as disclosed in my aforementioned application, so that point-like contact is established between adjacent particles. Thus, the particles are bonded intimately or monolithically to form a maximum number of pores of uniform pore size and in a greater number than is possible with particles of random or other configuration. These particles may be of selected different sizes, i.e. a homogeneous mixture of large-diameter spherical particles and small-diameter spherical particles, or may be stratified to provide large-diameter particles distal from the surface of the duct to which they are bonded and small-particles proximal to the duct. Some of the particles included in the mixture may be of a synthetic-resin material or some other material which is volatile at an elevated temperature achieved during the coarse of electrical sintering or electrical homogenization to provide voids or pores of a greater size, corresponding at least to the volume of the volatile particles in the resulting structure.

Thus, many of the techniques described below for the formation of sintered bodies of metallic particles and the formation of sintered masses of metallic and non-metallic particles e.g. metal particles and synthetic-resin particles, can be used in the production of heat-exchanger walls according to the present invention and subjected to electrical homogenization. The temperature during the electrical processing and, if desired, prior to electrical homogenization as long as the treatment step is carried out in a furnace, can then be raised to the thermal decomposition temperature of the non-metallic particles if a nonoxidizing atmosphere is employed or the combustion temperature if an oxidizing atmosphere is provided.

DESCRIPTION OF THE DRAWING

The above and other objects, features and advantages of the present invention will become more readily apprent from the following description, reference being made to the following drawing in which:

FIG. 1 is an axial cross-sectional view through a mold for forming a tubular sintered body with the circuit means therefore;

FIG. 2 is a perspective view of the body produced by this apparatus;

FIG. 3 is a plan view of a sintered electrode for batteries;

FIG. 4 is a cross-sectional view taken on line IV—IV of FIG. 3;

FIG. 5 is an axial sectional view through an apparatus for making the electrode;

FIG. 6 is a diagrammatic cross-sectional view through an apparatus for the mass production of sintered bodies;

FIG. 7 is a diagrammatic cross-sectional view illustrating the production of a conductive seal;

FIG. 8 is a view of this seal as employed in a battery;

FIG. 9 is an axial cross-sectional view of a device for producing a sintered die;

FIG. 10 is a cross-sectional view diagrammatically illustrating the manufacture of a forming die or mold using the sintering technique of the invention;

FIG. 11 is a partial cross-sectional view of still another apparatus according to the invention;

FIG. 12 illustrates a circuit diagram according to a modification;

FIG. 13 is an axial cross-sectinal view through a heat-exchanger tube in accordance with the invention;

FIG. 14 is a perspective cross-sectional view through a radiator produced by the present method;

FIGS. 15 and 16 are partial cross-sectional views diagrammatically illustrating two stages of the instant method;

FIG. 17 is a representation of a sintered body prior to molecular orientation;

FIG. 18 is a similar view of this body subsequent to such orientation in accordance with the invention;

FIG. 19 is an elevational view, partly in section, of an apparatus for continuously depositing a sintered layer upon a substrate;

FIG. 20 is a cross-sectional view through a sintered body having a continuous metal core and multiple layers;

FIG. 21 is an axial cross-sectional view through a mold for producing sintered bodies by spark discharges;

FIG. 22 is a view similar to FIG. 9 illustrating selective densification of the sintered body;

FIG. 23 is a partial bottom view of an apparatus for continuously producing sintered rods according to the invention;

FIG. 24 is a cross-sectional view taken along the line XXIV—XXIV of FIG. 23;

FIG. 25 is a view simialr to FIG. 24 illustrating a modification of the continuous process;

FIG. 26 is a diagrammatic cross-section of a heat-exchanger tube produced according to the present invention;

FIG. 27 is a perspective cross-section illustrating a plate of a plate-type heat exchanger;

FIG. 28 is a detail view of a portion of another heat exchanger is cross-section;

FIG. 29 is a perspective view of a lattice structure for heat-exchange purposes, e.g. in a regenerative type of heat exchanger;

FIG. 30 shows another lattice substrate in a partial perspective view, prior to application of the powder;

SPECIFIED DESCRIPTION

Figure 32:
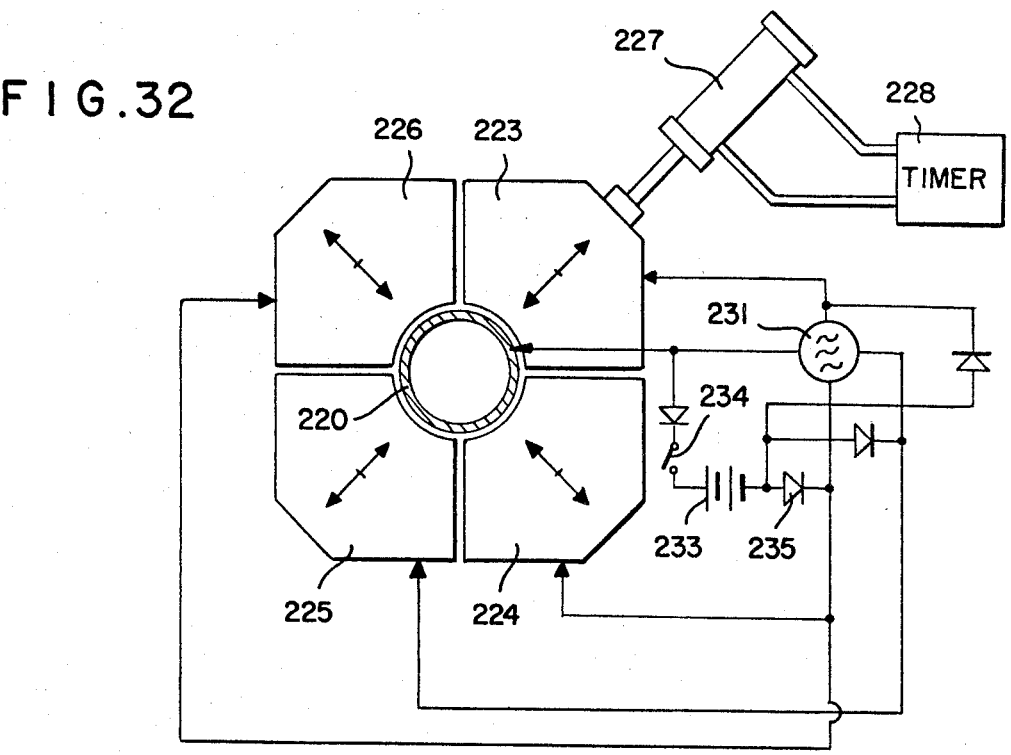
FIG. 32 is a diagrammatic end view thereof.

In FIG. 1 there is shown an apparatus for producing tubular porous bodies which can serve as filters or the like. The apparatus comprises a conductive base plate 1 upon which is disposed a tubular mold 2 having a core 2'. The mold cavity 3 of this mold contains a mass of sinterable particles which is compacted under the weight of an electrode 4. The shank 5 of this electrode is surrounded by a coil 7 which is supplied by an alternating-current source 8 for vibration of the electrode 4 in the direction of the arrow 6. Electrode 4 is urged downwardly (in the direction of arrow 9) by gravitational force. A battery 13 is bridged, in series with the secondary of a transformer 14 across the electrodes 1 and 4 while another direct-current source is connected in series with a load resistance 17 represented as a separate resistor but actually the resistance of the conductors tied to transformer 14. A capacitor 16 is connected across the battery 18 and resistor 17.

A mass of conductive powder or an admixture of conductive powder with up to 20% by weight of a nonconductive powder is disposed in the mold cavity 3 and vibrations intiated in the direction of arrow 6. With a frequency determined by the time constant of resistor 17 and capacitor 16, the latter periodically charges from battery 18 and discharges across the primary winding of transformer 14 when the switch 15 is closed. A pulsed current superimposed upon direct current of batter 13 is thus applied to the electrodes 1 and 4. A spark discharge is initiated between the electrodes 1 and 4 and the particle mass in contact therewith. Since the particles are in relatively light contacting relationship, this spark proceeds through the mass to form a coherent sintered body therefrom.

The mass of particles disposed in a graphite mold cavity serves as the workpiece below.

EXAMPLE I

The particle mass within the graphite mold 3 comprises a first layer 12 of relatively small-sized particles (e.g. having a particle size of approximately 0.025 mm). This layer is followed by a relatively larger layer of large-sized particles 11 having a particle size of about 0.1 mm. and is followed by another layer 10 of the small-size particles. The mass of particles consists, substantially uniformly, of 70% by weight copper and 30% by weight zinc. The resulting body, which is formed by a 400-cycle-per-second spark discharge having an overall intensity of approximately 250 kilojules over a processing time of 25 seconds, has a tensile strength of 7 kg. per mm.$^2$ as compared with 5.3 kg. per mm.$^2$ for a similarly dimensioned porous body produced by thermal fusion in a furnace and under elevated pressures. The total mechanical pressure applied to the mass of particles is approximately 50 kg. per cm.$^2$. Microscopic examination of the body fracture indicates that the pore distribution is substantially uniform (at a magnification of 50 X) in contradistinction to the irregular pore formation of earlier bodies. In addition, the porosity is approximately 67% as compared with 60% for bodies formed by the known techniques. A total spark discharge of approximately 250 kilojoules was employed. The body was characterized by terminal zones 10 and 12 of relatively densely packed material which served to reinforce these regions of the body which had a total weight of approximately 450 g.

EXAMPLE II

The metal particles of Example I were replaced by a mass of particles consisting substantially of 80% by volume of copper, 5% by volume of a synthetic resin (Bakelite phenolic), 5% carbon (graphite) and 10% lead. All of these materials were present as powders passing 325 mesh. The tube which had a diameter of 20 mm., an internal diameter of 10 mm. and a length of 15 mm., was formed by the passage of a spark discharge (repetition frequency approximately 400 cycle/sec.) having a total energy of 10 kilojoules for a period of 3 seconds. The mechanical pressure applied was approximately 500 g. per cm.$^2$. The resulting bearing sleeve had a friction coefficient (0.02) which was substantially improved over a conventional sintered copper lead bearing (friction coefficient 0.065; wear ratio 2.7 mm./km.) having similar proportions of copper and lead; the improved bearing had a wear ratio of 0.87 mm./km. at 8 meters./sec. speed against carbon steel with motor oil lubricant and a contact pressure of 12 kg./cm.$^2$.

In FIGS. 3 and 4 there is shown a sintered nickel electrode for use in nickel/cadmium batteries and capable of high-rate discharges. The electrode 19 has a peripheral zone 20 of relatively porous material and an internal core 21 of relatively dense material which is bonded to a contact plate 22. Zone 21 is formed in situ by the concentration of electric current as can be seen in FIG. 5. In the latter figure, a nonconductive mold 23 is disposed upon a conductive electrode plate 24 which is juxtaposed with a rotatable electrode 25. A direct-current source 27 is bridged across these electrodes in parallel with an alternating-current source 26.

EXAMPLE III

A mass of nickel powder having a particle size of approximtely 2 microns is disposed in the mold 23 and a nickel plate set eccentrically in the mass. This nickel plate has a thickness of 0.2 mm. and is of 3 mm. width and 5 mm. length and rests against the electrode 25 (15 mm. diameter, 5 mm. thickness), which is rotated to prevent adhesion of the particles thereto. A mechanical pressure of 150 g./cm.² is applied to the mass and a spark discharge (repetition frequency 400 cycles/sec.) of approximately 180 kilojoules is passed therethrough for about 6 seconds. The alternating-current power (400 cycles/sec.) is approximately 60% of the direct-current power with a frequency of about 10 kc./sec. The resulting body had a diameter of 15 mm. and a thickness of about 5 mm. with a central region 21 having a thickness of approximately 1 mm. While the peripheral zones 20 had thicknesses of about 2 mm. The porous outer shell was characterized by a specific gravity of approximately 2 while the dense inner core had a specific gravity of approximately 7. Examination of the sintered body structure indicated a relatively sharp separation between the core and the shell. The resulting electrode was capable of discharging rates up to 10 times that attainable by known practices in a nickel-cadmium cell charged at 30 ma. for 12 hours and discharged at 50 ma. over a period of 6 hours.

The apparatus in FIG. 6 serves for the serial production of sintered bodies and comprises a piston 28 which urges a mass 37 of sinterable powder within a casing 29 into the cavity formed within a mold 30. The mechanical pressure is, however, less than 100 kg./cm.². A pair of electrodes 31, 32 are slidable into the mold cavity, electrode 32 being provided with a drive source 34 for reciprocating it in the direction of arrow 35. Electrode 31 is spring biased by a coil spring 33 and yields as a member 32 is positively reciprocated so that a pressure of up to 100 kg./cm.² is maintained upon the mass within the mold cavity. The electrodes are connected across a source of direct current and of periodic current superimposed thereon. With each reciprocation of electrode 32, spark discharge is sustained between the electrodes, which results in sintering of a body within the cavity of mold 30. As electrode 32 moves into its extreme left-hand position, it pushes the sintered body thus formed out of the cavity from which it falls in the direction fo arrow 36. When electrode 32 is again withdrawn from the cavity, piston 28 pushes additional powder into the latter for repetition of the operation.

In FIG. 7, I show the in situ formation of a sintered body in forming a liquid-tight seal. A battery casing 38 is provided with a bore which constitutes a mold for a mass of sinterable particles 39 which is disposed between electrodes 40 and 41. The latter are bridged by a direct-current source 44 in series with a resistor 43 and by a capacitor 42. The spark discharge developed across the electrodes 40, 41 results in a sintering together of the particle 39 and a thermobonding of the sintered body with the battery casing 38 which may be of thermoplastic or synthetic-resin material. Particles, having a maximum size of approximately 10 microns, can be used in this connection to produce a liquid-impermeable seal which nevertheless permits the escape of gases and is conductive.

As can be seen in FIG. 8, the sintered body 39' thus resulting may be spark welded to a mass 45 of sintered particles carried by a battery electrode 46 and to a mass 47 of similarly sintered particles provided on the terminal tab 48. This arrangement, wherein all of the particles may, advantageously, provide means for completely sealing the terminal to the case to prevent the escape of liquids.

In FIG. 9 there is shown an arrangement for producing dies. A conductive block 49 is formed with a contoured mold cavity 50 which contains a mass of particles 51. A counterelectrode 52 overlies this mass of particles and is provided with a support rod 53 via which it is spring biased into contact with the particles. A battery 54 is bridged across the electrodes 52 and 49 together with a capacitor 55 while a delay line, consisting of inductances 57 and capacitances 56, is also connected across capacitor 55. This delay line provides a series of secondary pulses which follow the intitial spark discharge as produced by capacitor 55.

EXAMPLE IV

A mass of ferrochrome (18-8) stainless-steel particles having an approximate particle size of about 14 microns is disposed in the cavity 50 of block 49 which consists of carbon. The vertically vibrating electrode 52, which is composed of high-carbon steel, provides a mechanical pressure downwardly of 0.56 kg./cm² (maximum pressure 270 kg./cm.²). The direct-current voltage of source 54 is about 50 volts while the delay line 56, 57 together with capacitor 55 superimposes an alternating-current voltage thereon of approximately 400 cycles per second with an intensity of 120 volts. The spark repetition frequency was 400 cycles/second and the total discharge intensity 27 kilojoules. The sintered body is bound firmly to the electrode 52 and has a specific gravity equal to 99% of the specific gravity of solid ferrochrome when the electrode is vibrated in the direction of arrow 58. This vibration takes place at 100 cycles per second. Without such vibration this specific gravity is only 98% of that of the solid material. To produce a die having a length of 20 mm., a width of 10 mm. and a thickness of 10 mm. approximately, 10 seconds are required. The duration of the spark discharge is, however, only a fraction of the total processing period (e.g., less than one second). A die sintered in a conventional furnace has a specific gravity of 88% of the solid material.

In FIG. 10 I show another arrangement, this time for the production of a female die, wherein the carbon-steel block 59 is provided with a cavity 60 containing the particles 61. An electrode 51' or sintered metal is carried by a plate 52 and serves to form the contoured sintered female die. The entire unit is enclosed in a casing 62 from which air may be aspirated at 63 and into which a suitable atmosphere may be introduced via an inlet 64.

The block 59 is carried by a pair of leaf springs 65 and is vibrated in the direction of arrow 66 by suitable means not shown. In the present embodiment the delay line disclosed in connection with FIG. 9 is dispensed with and the circuit means includes a spark gap 67 of predetermined dimension which is tied in series with the capacitor 68 across the electrodes 52 and 59. A battery 69 in series with a choke 70 and the lead resistance 71 is bridged across the capacitor 68 with a switch 72. The characteristics of this circuit are so selected that the pulsed direct-current discharge of capacitor 68 and battery 69 is insufficient to bridge the spark gap 67 during initial sintering when a sintering gap is present between the electrodes but is, however, capable of continuously discharging across gap 67 when an initial sintering of the powder has been effected. To produce a breakdown or discharge across gap 67 during the earlier stages of operation there is provided an additional circuit consisting of a rectifier bridge 73 which is tied to the secondary of an isolating transformer 74 supplied by an alternating-current source 75. This direct current does not flow across the gap 67 and the capacitor 68 until supplemented by a triggering pulse derived from a rotatable inductor 76 of magnetically permeable material. An energizing coil 78 is supplied by a direct-current source 78 to develop a constant magnetic field which, when traversed by the projections of wheel 76, is concentrated and swept across a pick-up coil 80, in series with rectifier bridge 73. Rotation of wheel 76 by motor 81 results in the periodic sweeping of coil 80 by the tabs with a consequent induction of a primary breakdown pulse and a plurality of lesser pulses. The pulsed current (e.g., at a frequency of about 400 cycles per second) for ferrochrome powder as employed under the conditions indicated in Example IV continues only until the spark discharge through the particles 61 terminates. Thereafter, with gap 76 in a substantially constant state of discharge, a direct current is applied to the electrode by battery 69 as supplemented by bridge 73.

The apparatus shown in FIG. 11 can be used for the production of sintered bodies under continuously controlled conditions. The nonconductive mold 82 is disposed upon an electrode plate 83 and contains the powder 84 which is lightly compressed by a counter electrode 85. The mechanical pressure of the latter is determined by the position of its piston 86 which is received within a hydraulic cylinder 87. Hydraulic fluid is supplied to the latter by a distributing valve 88 which is fed by a pump 89 from a reservoir 90. The distributing valve 88 is controlled by a selenoid coil 91 bridged across the electrodes 83 and 85 and responsive to the potential drop thereacross. It will be immediately apparent that this potential drop is a direct measure of the density of the particles since greater compaction involves a decreased resistance thereacross. Additionally, there is provided a magnetostrictive vibrator for oscillating the electrode 85 within limits. This vibrator comprises a pair of windings 91, 92 connected in aiding relationship and wound about the shanks of a D-shaped coil 93. These coils are energized by an alternating-current source 94 whose output is superimposed upon a direct-current voltage derived from a battery 95. A capacitor 96 is tied in series with source 94 across the coils 91, 92 while a choke 97 is serially connected with battery 95. The direct-current biasing potential applied to the electrodes 83, 85 derives from a rectifier bridge 98 which is fed by a secondary winding of transformer 99 whose other secondary applies a super-imposed alternating current. Again the electrodes are bridged by a capacitor 100.

Whereas the arrangement shown in FIG. 12 permits control of the density of the sintered body by varying the mechanical pressure applied thereto, it is preferable in many instances to control the density by the characteristcs of the spark discharge. This may be effected by regulating the frequency of the discharge at least during the early stages. To this end the direct-current source 101 is connected in series with the output winding of a transformer 102. This transformer forms part of a varying-frequency oscillator and is saturable to control this oscillator. The oscillator consists of a pair of push-pull transistors 103, 104 whose emitters are energized by a battery 105 in series with respective sections of the primary winding of the transformer. The base of each transistor is serially connected with the energizing windings of the transformer and returned to the emitter via a suitable biasing resistor 106. The transformer is also provided with a control winding 107 in series with a rectifier 108 and a variable resistor 109 for determining the degree of saturation of the core and thus the frequency of oscillation. The control circuit is bridged across the electrode 110, 111 and detects the direct-current-voltage drop thereacross. This circuit is poled so as to increase the frequency of the oscillation should the density of the sintered body, below a predetermined value, fall.

In FIGS. 13 and 14 there are illustrated heat-exchange arrangements produced by the method and apparatus of the present invention. The structure of FIG. 13 makes use of a sintered sheath 112 to provide a fluid-permeable layer of high-surface area around and through which a gas or liquid can pass as indicated by the arrows 113. This layer can be formed with the usual fins 114 and is bonded to the metallic tube 115 which is internally contoured (i.e., provided with annular depression 116) to increase turbulence in the fluid flowing therethrough. A radiator 117 of FIG. 14 is provided with channels 118 formed by relatively coarse particles (particle size between 60 and 100 microns) between dense rows formed by fine particles (5 to 6 microns). The entire body, which can be formed in a single sintering operation by the methods previously described, can be composed of copper particles and has excellent heat-exchange characteristics.

FIGS. 15 and 16 are schematic illustrations as to what occurs in the course of the present method. During the initial stages of sintering, the bodies 119 and 120, which are generally of irregular configuration in practice, are in light contact or even slightly spaced so that a spark discharge is formed between them. This discharge forces them into contact under considerable pressure and effects a flow of material between them at their contact region. Subsequent passage of current (FIG. 16) causes the particles to flow together to a greater extent and, since it is effected under the force field of a undirectional electric current, results in an internal crystal orientation so that the fusion point is indistinguishable from the remainder of each particle. They thus constitute a single crystal. This effect characterized substantially all of the methods presently described.

The molecular orientation of sintered bodies is more dramatically represented in FIGS. 17 and 18 wherein magnifications of oriented and nonoriented bodies of sintered dendritic material are shown.

EXAMPLE V

A mass of dendritic Alnico alloy particles, having a mean particle size of 0.1 mm., are formed into a rod having a diameter of about 2 mm. and a length of 5 mm., is formed in an apparatus of the type shown in FIG. 12 (graphite holder). A spark-discharge sintering operation (total time 10 sec.) was performed and a total energy of 10,000 joules at an ambient pressure of $10^{-2}$ mm. a pressure of 250 kg./cm.$^2$ was applied during sintering. The sintered body was removed immediately after the first discharges (about 2,500 joules — 5 seconds) and found to have a random distribution of 10-micron dendrites when etched with $HNO_3$+alcohol (FIG. 17). When the operation was carried out again with about 5,000–7,500 joules required (10 seconds used), the dendrites were found to be aligned in uniform rows about 0.5 mm. in length and 0.3 mm. in width (FIG. 18). The corrodability of the molecularly oriented body was found to be less than that of the similarly sintered but not oriented body when exposed to etching liquid. In addition, similar test conditions indicated that the resistance-sintered conventional magnet had a strength of 1500 to 2000 gauss while spark-sintered bodies had a minimum strength of 2000 gauss prior to molecular orientataion and from 3500 to 4000 gauss subsequent thereto.

EXAMPLE VI

Similar techniques were employed with a magnetic mixture consisting by weight of 85% iron, 10% zinc and 5% $Cu_2O$. The mixture was formed in suspension in a volatile vehicle (ethyl alcohol) and a discharge current passed therethrough at a pressure of 130 kg./cm.$^2$ applied to the particles in the holder. About 5000 joules were employed during the discharge sintering and the remainder for orientaion. A total time of 3 seconds was required for a rod having a length of 5 mm. and a diameter of 10 mm. in a graphite holder. All of the particles ranged in size between 5 and 10 microns. The ferrite rod was found to have greater magnetic retention (1.7 oersteds) than rods having similar Fe contents but formed by conventional techniques from iron oxide (1.5 oesteds).

The apparatus of FIG. 19 permits continuous formation of sintered layers upon a metal substrate. The substrate 121 may be a metal sheet to be clad with the sintered metal layer to improve its fatigue and corrosion resistance, is passed between a pair of rollers 122, 123 serving as counterelectrodes for the sheet. As the upper layer of, say, ferrochrome powder 124 is deposited upon the sheet and bonded thereto while being sintered into a coherent coating upon passage into the spark zone at electrode 112, the lower layer 126 is carried by the conductive band 125 into the spark zone and bonded thereat to the substrate.

EXAMPLE VII

A dumbell-shaped rod having enlarged extremities (50 mm. diameter) and a shank of smaller diameter (30 mm.), the total rod length being about 150 mm. with the shank having a length of 50 mm., is provided with a surface coating of 0.02 mm. of tungsten carbide by spark discharge. The rod was poled negative with the counter-electrode positive while a total power of 2000 joules was employed for a sintering time of 4 seconds at a pressure of 3 kg./cm.$^2$. The particle size was 0.5 micron. Repeated bending under a stress of 50 kg./mm.$^2$ on an ONO-type rotary fatigue-testing machine demonstrated that an uncoated high-carbon steel rod broke after $5 \times 10^3$ cycles while the treated rod broke only after $5 \times 10^5$ cycles.

The substrate 127 of FIG. 20 is shown to be provided with a plurality of superimposed layers of sintered metal. It is thus possible, merely by positioning a series of layers of different metal particles in one of the molds previously described to bond, say, an aluminum layer 128, 129 to a layer of copper 130, 131. This in turn may be fused directly to the metal or to a nickel layer 132 thereon. Since the atomic size of aluminum is less than that of the steel substrate, there will be little tendency for the aluminum to adhere directly to it.

In the arrangement of FIG. 21, a casing 133 forms a separable mold into which extend the juxtaposed spaced electrodes 134 and 135. The circuit means 136 develops a space discharge, which is spread by the dielectric distributor 137 to the periphery of the body, between the electrodes to sinter the particles together and imbed the electrodes therein.

Another device for localizing the passage of current in the sintering of powders is illustrated in FIG. 22. The conductive but highly resistant block 138, which may be composed of carbon, is engaged by spaced contacts 139 of an electrode 140. The spark discharge developed between a counterelectrode 141 and the block 138 is localized in the region of contacts 139 since these regions constitute low-resistance paths, thereby producing a sintered body having increased density at these regions.

The apparatus of FIGS. 23 and 24 is designed to permit the continuous sintering of particles into a coherent rod. The apparatus comprises a pair of shaping rollers 142 which are spaced from each other and pass a spark discharge through powdered metal 143, supplied by the hopper 144, therethrough. The emanating rod is coherent and may constitute an electrode as indicated in FIG. 25. In pulsed case the feed plunger 146 applies a light mechanical pressure to the powder within the hopper 147 whose constriction 148 forms a die. Since the previously formed rod 149 is coherent and conductive, it may constitute an electrode so that a spark discharge results at the die. A magnetic shaping of the coherent rod, which nevertheless is somewhat plastic as a result of its elevated temperature, is carried out by applying a plused current through a surrounding winding. This pulsed current is developed across a spark gap 151 by a capacitor 152 as previously described.

A pair of roller 153, 153' serve as contacts for the rod 149. Roller 153' is connected to one ouput terminal of a circuit whose battery 154 bridges the electrodes in parallel with an alternating current source 155. The latter is, in turn, tied to a saturable reactor 156 which controls the A-C power level and has its biasing winding in series with the wiper of a potentiometer 157. The latter is in circuit with a biasing battery 158 across the rollers 153, 153'. Should the density of the rod 149 suddenly fall, the voltage drop detected across rollers 153, 153' will increase to cause the saturable reactor to raise the power level and vice versa.

Figure 33:
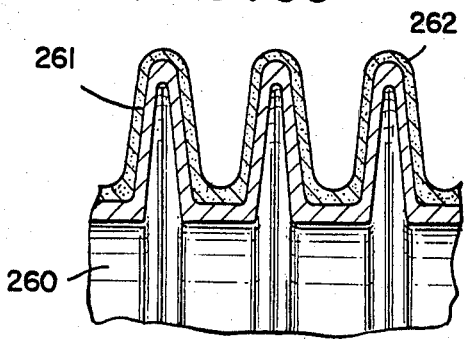
FIG. 33 is a cross-section of a part of a wall of a heat-exchanger tube according to another feature of the invention.
Figure 34:
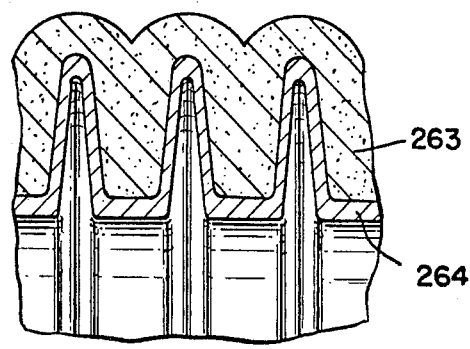
FIG. 34 is a view similar to FIG. 33 but illustrating another embodiment.
Figure 35A:
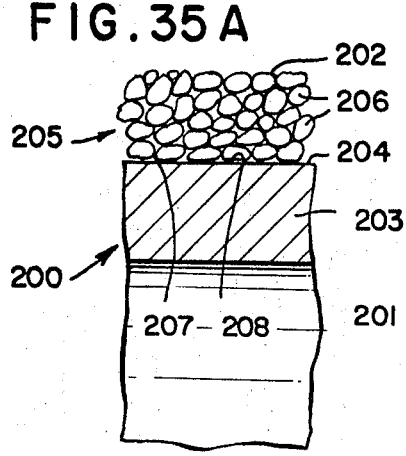
FIGS. 35A through 35C are diagrammatic views of portions of a heat-exchanger wall drawn to vastly enlarged scale and illustrating the principles of the present invention.
Figure 35B:
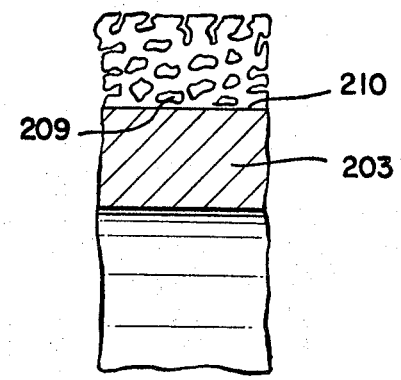
Figure 35C:
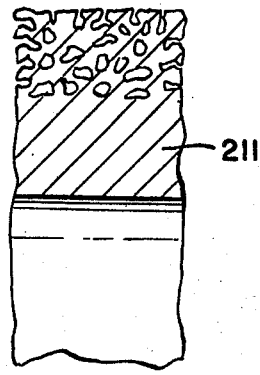

In FIG. 26 through 34, I have shown the application of some of the above principles to other heat-exchanger forms while FIGS. 35A through 35C illustrate these principles as applied to heat-exchanger surfaces. In FIG. 35A, for example, I have shown a heat-exchanger substrate 200 which may represent the wall of a heat-exchanger tube or a heat-exchanger plate. It will be understood that, throughout this discussion, the heat-exchanger members may be used in conventional heat-exchanger structures and that the term "heat exchanger" is intended to be used in its broadest sense to include any member involved in heat transfer from one fluid to another. For example, heat-exchanger tubes according to the present invention may be collected in the tube nests or bundles and provided with the usual headers and housing to pass liquid through the tubes while a gas is passed along the outer surfaces thereof. The heat exchanger may be a boiler or can form part thereof, in which case one wall of the heat exchanger may be exposed to combustion products while the other is in contact with the fluid to be heated.

Moreover, the heat exchanger may be of the liquid-liquid type in which liquid contacts both sides of heat-exchanger surface, of the liquid-gas type, wherein liquid contacts one surface and gas contacts the other, of the gas-gas type in which gaseous fluids contact both surfaces of the heat exchanger, and of the regenerative type in which a first fluid contacts the heat-exchanger body at one type and another fluid contacts the body at a different time to transfer heat to or abstract heat from this body.

Referring to FIG. 35A, however, I have described the invention generally in terms of an indirect or nonregenerative heat exchanger in which heat transfer is effected between a fluid in contact with the inner surface 201 of the tube and another fluid in contact with the outer surface 202 thereof by heat transfer through the tube wall. In this case, the tube wall consists of the continuous-metal member 203 of a metal of high thermal conductivity, e.g. aluminum or copper, upon the outer surface 204 of which has been deposited a particle layer 205, discrete particles of which are designated at 206. The particles have been applied by any conventional compacting technique, e.g. high energy rate forming as described in U.S. Pat. No. 3,566,647 or any of the prior applications or patents described therein, as described in U.S. Pat. No. 3,552,633, as described in the parent applications of the present case, or as described in the sintering art whereby mechanical compaction is followed by furnace heating. Wherever conventional procedures are used, however, the particle-to-particle interfaces 207 and the particle-to-substrate interfaces 208 are insufficiently monolithic to prevent corrosion.

In FIG. 35B, it can be seen that the electrical sintering methods previously described in the constant application tend to result in homogenization of the particle-to-particle bonds so that discrete particles are seldom discernible and the metal of the particle mass forms bridges around the pores 209 which remain. However, a contact interface tends to remain at 210 between the particle mass and the substrate 203, although bonding occurs, for the most part.

With the homogenization step of the present invention, practiced upon a conventionally compacted particulate mass or even upon the electrically sintered mass previously described, substantially no interface remains at 211 and a monolithic structure is formed. The homogenization step is, therefore, effectively a welding operation using pulsed electric current with preferably square-wave pulses, although sinusoidal signals have been successfully used, at a frequency of 1 to 10 MHz, a current of 0.1 to 100 kiloamps. and conditions in which fusion welding may occur.

Figure 31:
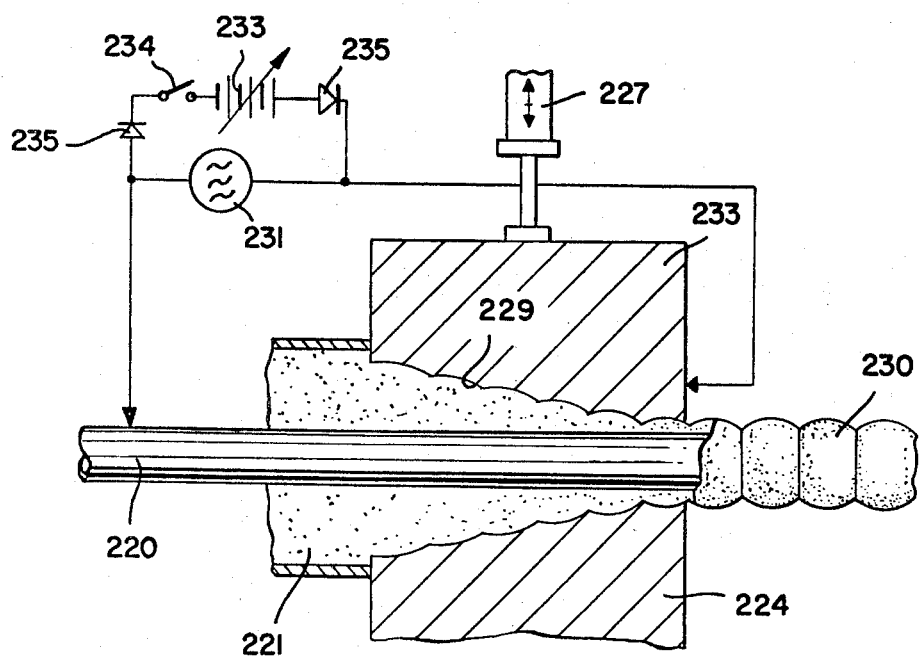
FIG. 31 is an elevation view, partly broken away and partly in diagrammatic form, of an apparatus for producing a corrugated heat-exchanger tube according to the invention.

In FIGS. 31 and 32, moreover, I have shown an apparatus for effecting such fusion. In this embodiment, a copper tube 220 forms the substrate and is coated with aluminum, copper, nickel or iron powder shown as a mass 221, the powder having a particle size ranging in order from a 0.1 millimeter to 5 millimeters and preferably between 0.1 and 0.5 mm. In this diagrammatic illustration a mass of particles 221 is fed around the tube 220 between a plurality of compaction dies 223, 224, 225, and 226 which are movable readily toward and away from the copper tube by, for example, fluid cylinders 227 only one of which has been shown in FIGS. 31 and 32. All of the cylinders are triggered simultaneously by a timer 228.

I have found it to be highly desirable to provide a graduated cross-section for the shaping die so that the opening of the latter is reduced progressively in the direction of feed of the powdered material and the substrate and I preferably accomplish this by providing matching undulating profiles 229 along the confronting faces of the dies. The dies may also be replaced by rollers or the like which define the progressively tapering cross-section and may be profiled to form ridges, fins or undulations 230 on the finished pipe as illustrated. A source of high-frequency welding pulses is provided at 231 (diagrammatically illustrated) the source being connected between the substrate 220 and the individual die members 223 through 226.

When iron or other ferromagnetic particles are used, however, I prefer a superimposed direct current from a source 233 upon the high-frequency pulses by closing a switch 234. Diodes 235 may be provided in the d-c circuit to prevent short circuting of the high-frequency source through the d-c source. The d-c contribution may be of the same order of magnitude as the pulse contribution in terms of the current amplitude and may range between 0.1 and 100 kiloamps., although I prefer to provide a pulse current/total current ratio of substantially 20% to substantially 80%, the balance being the direct current contribution. The operation of the apparatus of FIGS. 31 and 32 is evident, the pulses being passed as the powder is compacted progressively around the substrate at pressures ranging between 10 kgs/cm$^2$ and tons/cm$^2$. The welding current pulses and, in the case of ferromagnetic powders, the superimposed pulse and direct current, produce a homogeneous bond as described in connection with FIG. 35C.

In FIG. 26, I have shown an embodiment of the tube, according to the invention, wherein the outer surface of the copper substrate 240 is provided with an undulating layer 241 of the powder while an undulating layer 242 of the powder is provided on the internal surface. The substrate in this case is undeformed, i.e. is not corrugated to correspond to the corrugations of the powder layers. However, the thicknesses of the powder mass may remain constant and the substrate may be deformed to provide the desired turbulance-promoting formations. The corrugations in this embodiment are shown to be substantially parallel, although a helical arrangement of the formations may be provided as well. The plate-type heat exchanger 243 illustrated in FIG. 27 comprises a copper sheet 244 deformed to have cup-shaped recesses 245 and generally spheroidal bulges 246 and is covered with a uniform coating 247 and 248 of powder in the manner described, both along its exterior and interior surfaces. As shown in FIG. 28, the bulges 250 may be provided with perforations 251 opening into cup-shaped layers 252 of powder. In this case, the powder layer covers only the protuberance on bulges of the plate and serves as both a diffusion layer, through which a fluid is dispersed, and a heat-exchanger surface of high area and porosity. The regenerative heat-exchange body 253 illustrated in FIG. 29 comprises a lattice work of tubules or rods covered by the powder layer 255 in the manner previously described; in FIG. 30, I have shown a lattice-like array of bars 256 adapted to form the substrate.

In FIG. 33, the substrate is shown to be a tube 260 provided with steep corrugations on fins 261 which are coated with a layer 262 of the powder in a uniform thickness whereas the contours of the powder layer 263 of the tube 264 of FIG. 34 do not necessarily follow those of the pipe.

EXAMPLE VIII

A copper tube having an outside diameter of 25 mm serves as the substrate and is coated with a layer of copper particles with a particle size 0.34 mm to a thickness of 3mm. The tube and the layer are uniformly corrugated with a pitch of 5 mm using the apparatus generally illustrated in FIGS. 31 and 32. The tube is fed at the rate of 3 cm/sec through the apparatus and has an internal diameter of 19 mm. The applied pressure is 47.5 kgs/cm$^2$, the temperature fusion is 970°C and pulses of a mean current of 1000 amps where applied at a frequency of 1.8 MHz. The tube is compared with an otherwise similar tube heated to 970°C in a furnace and formed with the same pressure. With liquid-flow rates of 250 mm/sec through the interior of the tube, with a temperature differential of 5° Centigrade across the tube, the heat conductivity in kilocalories/m$^2$ per hour per degree was about $2 \times 10^3$ for the nonhomogenized tube while the heat conductivity was about $4 \times 10^4$ for the electrically homogenized tube. At 10°C temperature differential, the heat conductivity was about $5 \times 10^3$ for the conventional tube but about $10^5$ for the tube according to the present invention. When iron particles were substituted, the pulse current was 600 amps and 800 amps of direct current was superimposed thereon. The bonding speed was 8 cm/sec and the bond strength was 15 kg/cm$^2$ as compared with a bond strength of 3 to 4 kg/cm$^2$ obtainable by soldering.

Figure 36A:
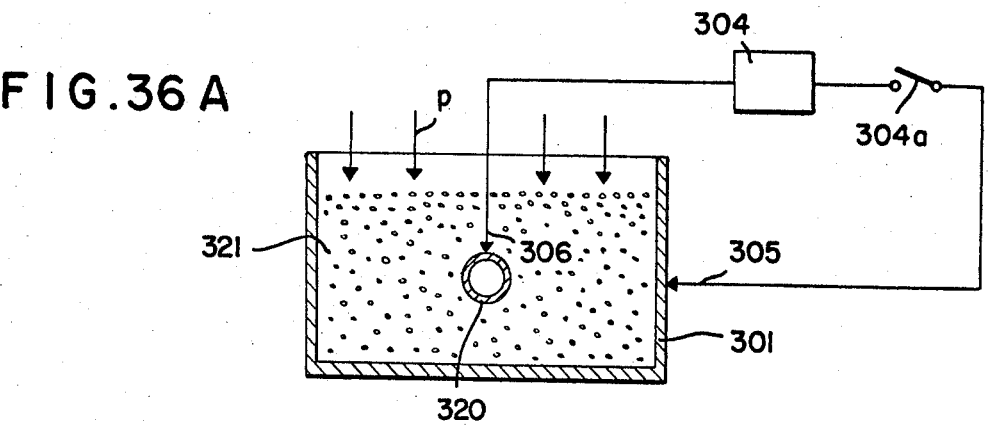
FIG. 36A is a transverse cross-sectional view through another apparatus for producing heat-exchanger tubes in accordance with the invention.
Figure 36B:
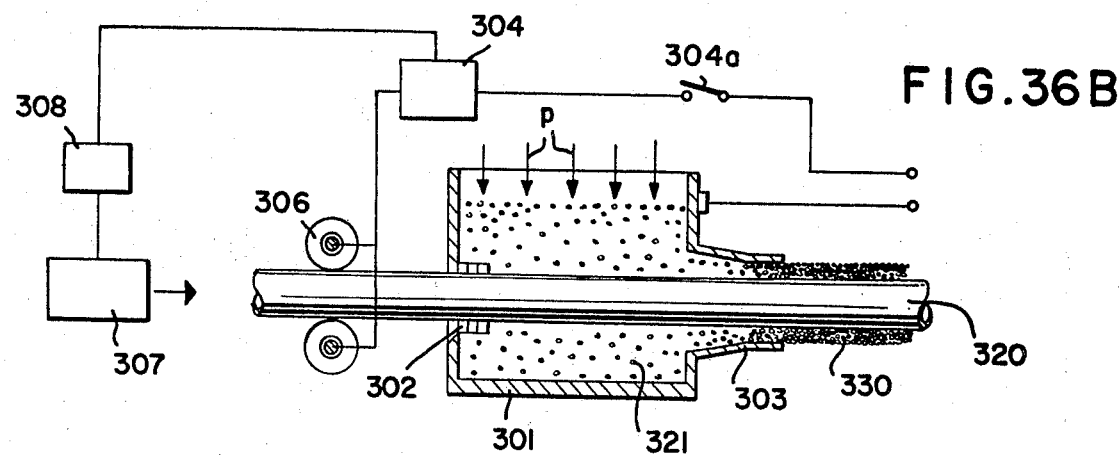
FIG. 36B is a cross-sectional view taken along the line XXXVIB—XXXVIB of FIG. 36A, the receptacle containing the powder surrounding the tube.

In the arrangement shown in FIGS. 36A and 36B, a copper heat-exchanger tube 320 is imbedded in discrete copper or aluminum particles 321 of spherical shape and passed through a bonding chamber 310 machined from graphite and which retains the particles in a loosely packed mass under a light pressure $p$ up to, say, 10 kg/cm$^2$. The chamber 301 is provided with an inlet guide 302 formed by an annular insulator through which the tube 320 is introduced and an outlet mouth 303 which constitutes a shaping die. A power source 304 is connectable, by means of switch 304a, across an electrode 305 in contact with the chamber 301 and roller electrodes 306 in contact with the tube 320 to pass through the latter and the particles 321 a single or succession of impulsive current thereby electrically using the particles in the region of the tube, and, especially, surrounded by the forming die 303, intimately against the tube 320. Thereupon, a feed drive 307 may be actuated to axially advance the tube in the direction of arrow to feed out that length of the tube to which the particles bonded as represented at 330 and may then be deactuated to close the switch 304a to recommence the sintering operation over the next given length of the tube 320. A timer 308 is here associated with the switch 304a and the feed drive 307 to determine the duration of each cycle of such progressive sintering operation and intervals or the unit length of such stepped feed. It has been already noted that use of spherical particles is preferable because of the advantage that they, when relatively loosely packed and then bonded together especially according to the present process, assure such a porous structure having intercommunicated voids and being essentially free from blind pores but with each particle-to-particle and particle-to-substrate bond forming a monolithic junction. Spherical particles are conveniently available commerically and may be those prepared by atomizing a molten metal into a liquid coolant.

EXAMPLE VIII

A copper tube having an outside diameter of 3mm and a thickness of 0.5 mm is fed through a chamber as diagrammatically shown in FIGS. 36A and 36B and in which spherical copper particles of a diameter of 0.4 mm are retained under a pressure of 1.5 kg/cm$^2$. When an impulsive electric current of 360 joules is applied between the electrodes, the copper tube receives over a length of 40 mm a uniform layer of 2 mm thickness of the particles bonded thereto, with the bond strength of 8.2 kg/mm$^2$. Those particles located at a distance beyond 2 mm from the tube surface are considerably heated but not fused together or to the graphite die surface and are dislodged as the tube is fed out from the die mouth.

Figure 37A:
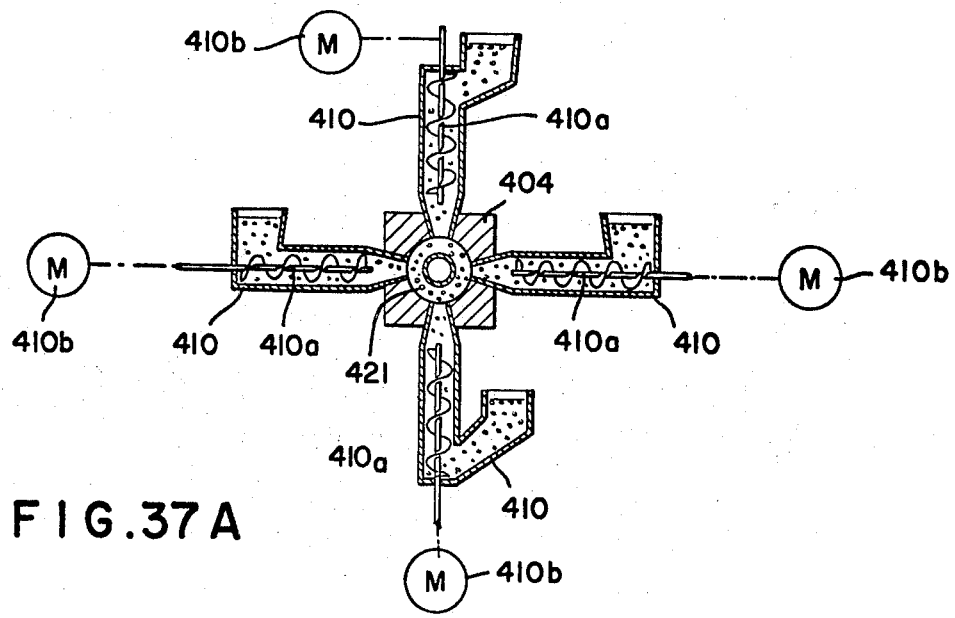
FIG. 37A is a view similar to FIG. 36A wherein, however, the powder is fed by respective conveyors from four sides to the chamber surrounding the tube.
Figure 37B:
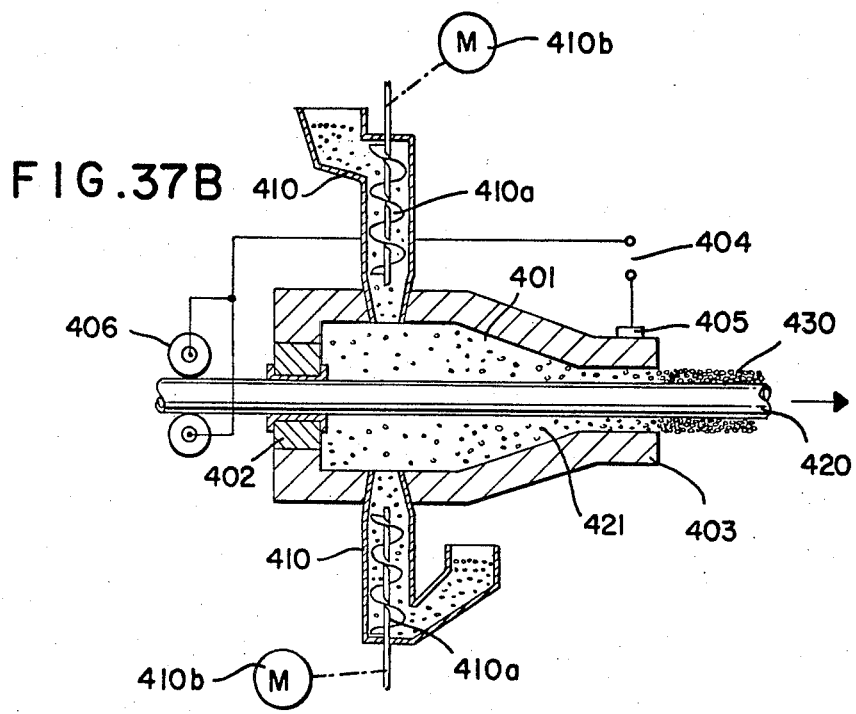
FIG. 37B is a longitudinal cross-section of the apparatus illustrated in FIG. 37A.
Figure 38:
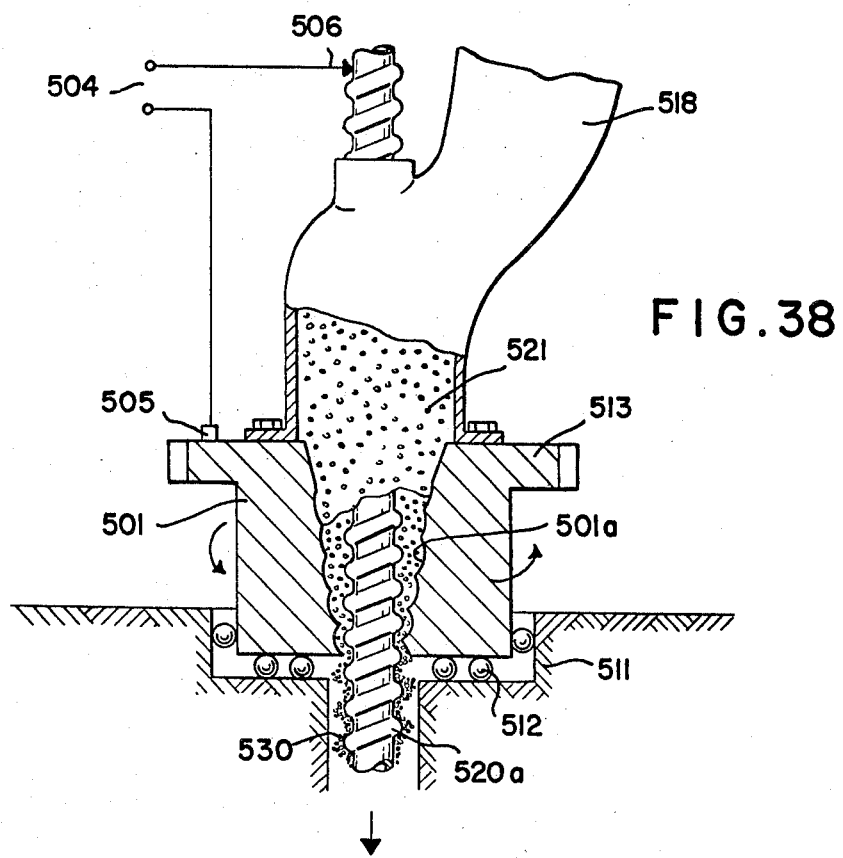
FIG. 38 is a vertical cross-sectional view through yet another apparatus for producing corrugated heat-exchanger pipes having a sintered-particle coating.

In a further embodiment shown in FIGS. 37A and 37B which represents a modification of the preceding embodiments, a plurality of particle feeders 410 are associated with the forming chamber 401 and provided each with a screw conveyer 410a and a motor 410b for driving same to feed a quantity of particles into the interior of the chamber 401 and to have them uniformly distributed around the tube body 420 under a light pressure maintained substantially constant. Here the feed of the tube 420 is either continuous or intermittent in conjunction with the feed of the tube 420 and a source of impulsive current 404 is connectable across electrodes 405 and 406 and may be replaced by a source of a high-frequency current as shown in connection with FIGS. 31 and 32. The particle-cladding of a tubular heat exchanger substrate having a helical corrugation can be achieved using a modification shown diagrammatically in FIG. 38 which makes use of a die chamber 501 having a forming surface helically corrugated correspondingly to the exterior surface of tube 520. This die member, mounted rotatably upon a base 511 by way of bearings 512, is formed with gears at its annular flange 513 which engage with worm gears of a disk rotated by a motor. Particles 521 to be bonded together and the tube 520 are introduced in the region of the die surface 501a from an upper chamber 518 defined with the die chamber 501 and a source of impulsive or high-frequency fusion current is again provided across the die member 501 and the tube body 520, the latter being biased downwardly. Thus, as the die member 501 is rotated axially while the fusion current is passed through the particles 521 and the tube 520, the latter is nonrotatably driven out progressively with the particles sheath 530 intimately and uniformly bonded on the corrugated surface 520a of the tube 520.

In some cases and, especially where an additional machining such as bending is required of particle-bonded heat exchanger members, I have found it desirable to anneal the member before such machining so that any internal strain as produced in the member as a result of it being relatively rapidly cooled from the bonding high temperature to a room temperature and which would adversely affect such machining may be eliminated. I have found that members when annealed at a temperature about 60% of the melting point of the constituent material permit a considerable bending without dislodgement of bonded particles.

Figure 39A:
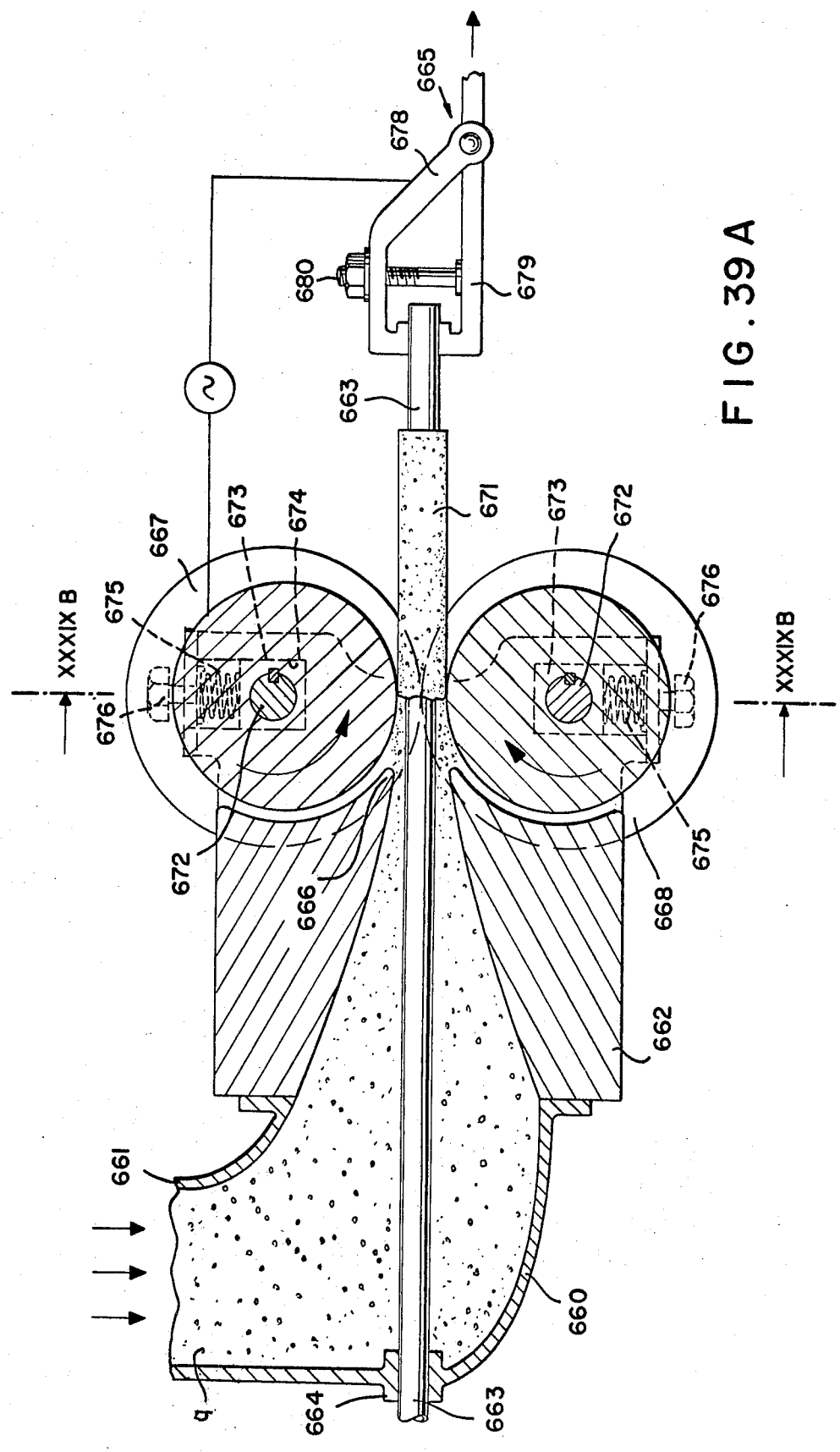
FIG. 39A is an axial cross-section through an apparatus for compacting the powder around the tube.
Figure 39B:
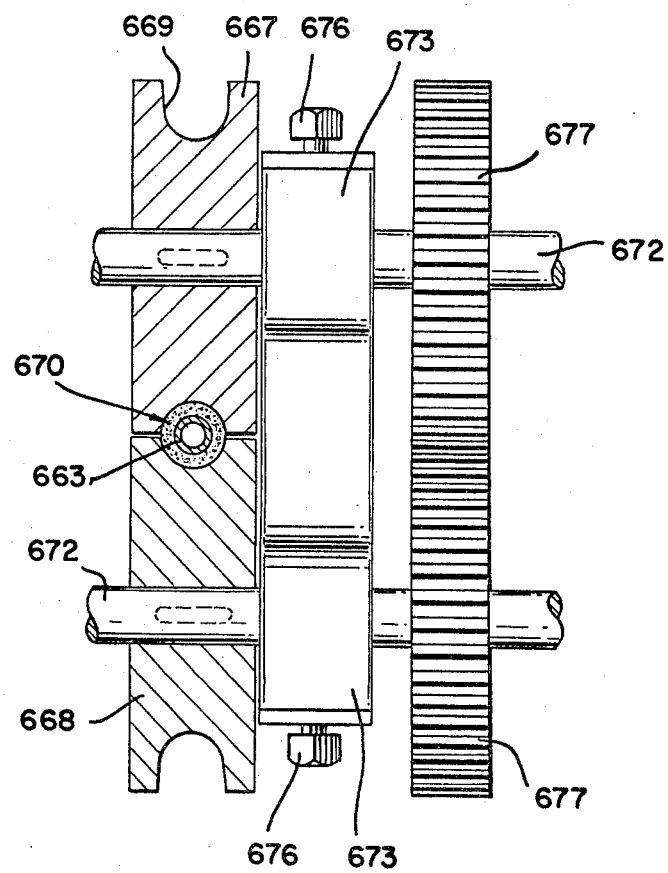
FIG. 39B is a cross-sectional view taken along the line XXXIXB—XXXIXB of FIG. 39A.

In FIG. 39A, I show a high-frequency fusion process wherein the particles $q$ are fed by a supply duct 660 under pressure from a conveyor of the like applied at 661, axially to a funnel-shaped feeder 662, coaxially surrounding the tube 663 which is fed through a guide bushing 664 in the axial direction by a gripper 665 engaging the leading end of the tube. At the mouth 666 of the funnel, there is provided a pair of compaction rolls 667 and 668, driven in opposite sense, and having a concave periphery as shown at 669 to define a circular die 670 within which the powder is compacted and sintered around the tube 663 to form a layer 671. The rolls 667 and 668 are keyed to shafts 672 which are mounted in vertically shiftable bearing blocks 673 guided at 674 for radial movment perpendicular to the tube. Compression springs 675, set at the desired pressure by screws 676, urge the rolls toward one another and bear against the journal blocks 673. The shafts 672 carry meshing gear wheels 667 which are driven by a motor (not shown) or are simply entrained by the axial movement of the tube to which they are tangential. The displacement mechanism 665 includes a clamp whose jaws 678 and 679 are connected by a hinge and can be tightened by a bolt 680. A welding current and sintering current source 681 is provided in the manner previously described.

In operation, the system functions as previously described to provide compaction, sintering and electrical homogenization.

Figures 40A, 40B:
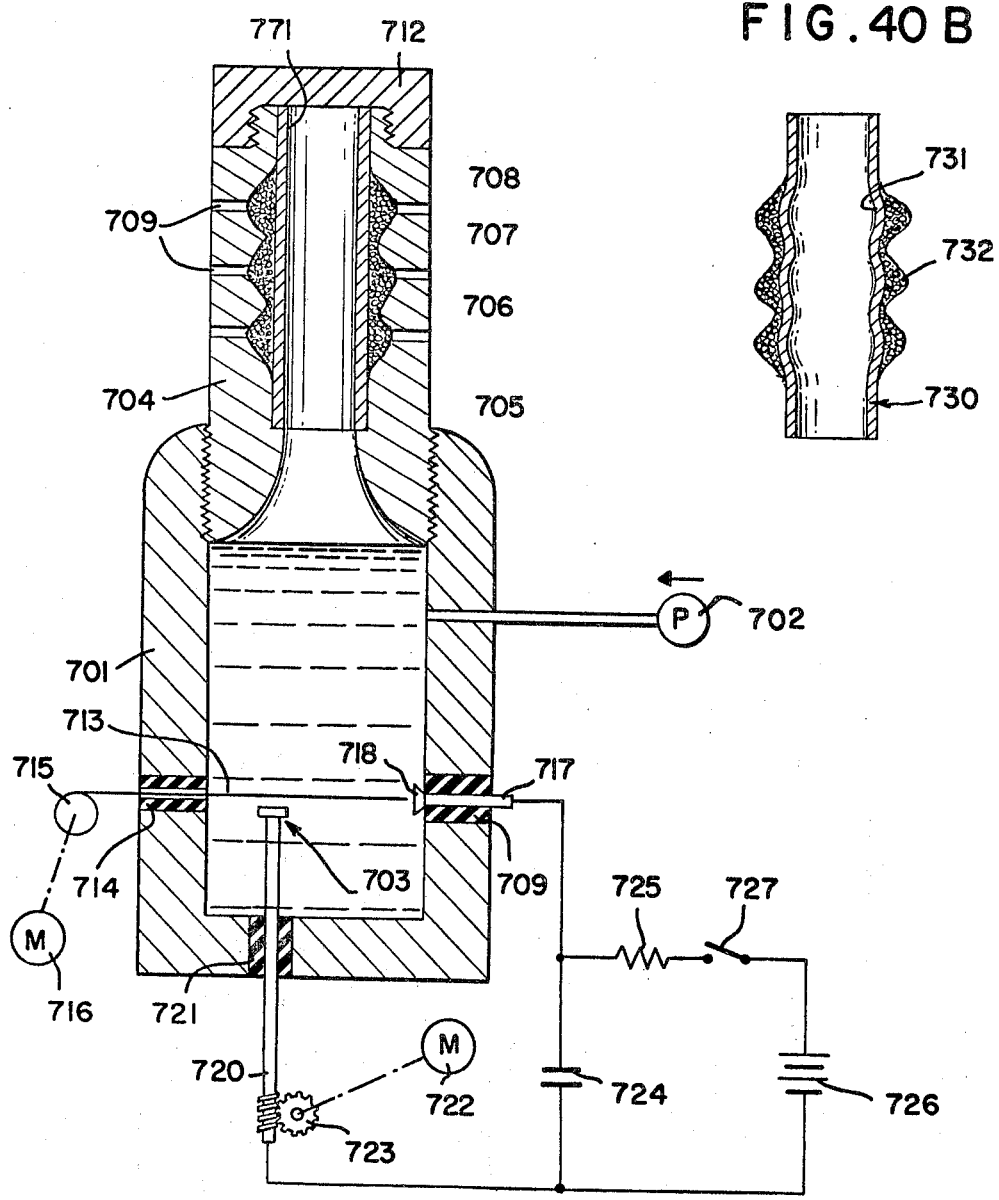
FIG. 40A is a vertical cross-sectional view through an apparatus in which the coating is compacted around the tube by shock-wave distortion of the tube.
FIG. 40B is a cross-sectional view through the deformed tube.

In FIGS. 40A and 40B, I show another system for compacting a particle sheath about a thermally conductive tube according to the present invention, the tube being thereafter subjected to electrical homogenization as described. In this case, hydrostatic and spark forming may be used to deform the tube simultaneously with the coating thereof and any of the systems for this purpose set forth in my copending applications Ser. No. 805,117, filed 4 Mar. 1969 (as a continuation-in-part of my then pending applications Ser. No. 574,056; Ser. No. 629,633; and Ser. No. 696,757; the latter two having issued as U.S. Pat. Nos. 3,461,268 and 3,522,653 respectively, while the first has been adandoned and replaced by Ser. No. 64,104 of 29 July 1970) may be used. More particularly, the apparatus illustrated in FIG. 40A comprises a liquid-containing chamber 701 which may be connected at 702 to a pump and is provided with a shock-wave generator represented generally at 703. At the mouth of the tube, there is provided a die 704 in the form of a cylinder threaded into the barrel at 705 and provided with annular cavities 706, 707, 708 open inwardly and communicating with the atmosphere via air vents 709. The die 704 may also be of the split type. A prebounded mass, e.g. lightly sintered ring or loose particle mass 710 may fill each of these cavities, whereupon the workpiece 711, here a cylindrical tube, is inserted. The end of the die is closed by a cap 712.

The shock-wave generator comprises a distructable conductor 713 which may be fed through an electrical insulated bushing 714 to the right from a supply reel 715 by a motor 716. At the opposite side of the chamber, a fixed main-discharge electaode 717 is juxtaposed with the end of the electrode 713 across a discharge gap 718 and is received in the insulated bushing 719. Transversely to the fusible electrode 713 extends a movable spark-discharge electrode 720 which is vertically shiftable in an insulating bushing 721 by the drive motor 722 whose wheel 723 may be formed as a pinion-engaging rack teeth on electrode 721. A capacitor 724 is connected across the electrodes 717, 720 and is chargeable through a resistor 725 from a battery 726 or other direct-current source when a switch 727 is closed.

When a purely hydrostatic mode of operation is preferred, the entire chamber and the die are filled with the substantially incompressible, preferably dielectric liquid, e.g. kerosene or transformer oil and a spark is generated at 703 to produce a shock wave which is transmitted through the liquid to the workpiece simultaneously expanding the latter into the die cavities and compacting particles thereagainst to yield a tube structure as shown at 730 in FIG. 40B. The corrugations 731, produced by the annular die cavities, are shown to be coated with compacted powder 732 which can be in the form of the usual particle sheath subjected to electrical homogenization.

The apparatus of FIG. 40A can also be used in a hydrodynamic mode. Thus the liquid level may be maintained at 733 in the chamber prior to spark discharge and the shock wave produced to propel the liquid into and compress gas trapped in the die to deform the workpiece and simultaneously clad it under the shockwave pressure. Furthermore, I may prefer to operate the pump 702 to create a liquid stream which is directed against the workpiece or in the direction thereof and to superimpose the discharge thereon.

As described in application Ser. No. 805,117, moreover, the discharge can be triggered in any of several ways. Firstly, the capacitor can simply be allowed to charge the breakdown potential of one of the gaps 718, 735, whereupon incipient fusion of the electrode 713 and ionization along its length will permit a high energy discharge to pass intially between the electrodes 717 and 720 and the consumable electrode 713.

As the electrode 713 is destroyed, the discharge bridges the electrode 717 and 720. Furthermore, in addition or, as an alternative, it is possible to move either electrode 720 toward electrode 713, or electrode 713 toward electrode 717 to reduce the gap and bring about the aforementioned breakdown.

It has also been found to be advantageous, in many instances, to apply high pressure to the chamber and thereby mechanically deform the workpiece with hydrostatic pressures before the shockwave is applied.

Figure 41:
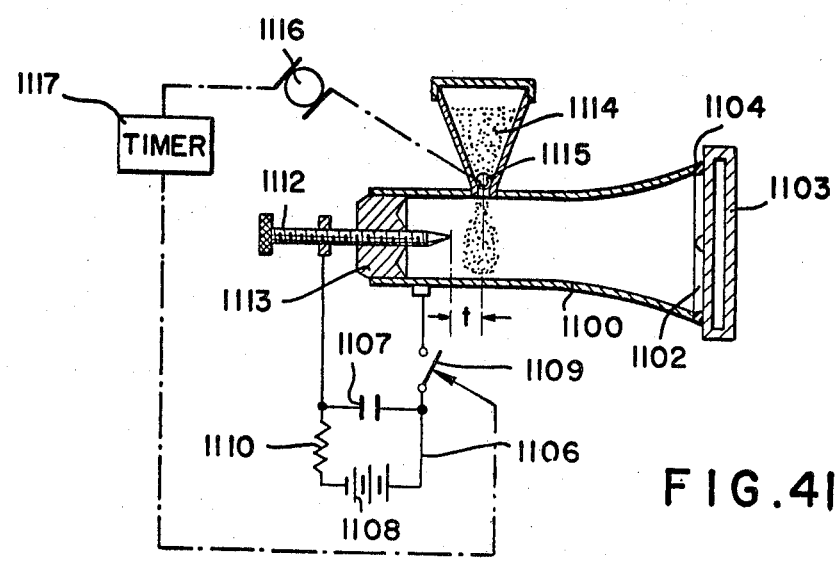
FIG. 41 is a cross-sectional view of another device for carrying out the process of the present invention.

Another method of coating a substrate with the powder or applying the powder to the substrate has been illustrated in FIG. 41 and is based upon the teachings contained in my application Ser. No. 64,104 mentioned earlier. This application is a continuation of applicaton Ser. No. 574,056 which, in turn, also is a continuation-in-part of application Ser. No. 311,061 (U.S. Pat. No. 3,267,710) and application Ser. No. 508,487, also mentioned above. In this system as well, the substrate coated with the powder can be subjected to electrical homogenization. The discharge chamber in this embodiment is formed as a barrel 1100 whose mouth 1101 is trained at the surface 1102 of the substrate 1103 which is thermally conductive and may be, as illustrated, a duct-formingg part of a heat-exchange assembly. A gap 1104 is provided around the zone of the surface 1102 surrounded by the barrel 1100 to prevent pressure increases therein from reducing the kinetic energy of the particles projected against the surface 1103.

At the other end of the barrel 1100, an insulating block 1113 receives a needle-type electrode 1112 which can be threaded into the barrel 1100 axially to a variable distance $t$ from the region at which a hopper 1114 feeds the pulverulent material 1105 transversely into the barrel. The hopper 1114 is provided with a feed or metering mechanism 1115 whose motor 1116 is driven intermittently by a timer 1117 which also controls a switch 1109 in the supply circuit for the coating gun. The supply circuit 1106 comprises a direct-current source, shown as a battery 1108, across which is bridged a capacitor 1107 in series with a charging resistor 1110. The distance $t$ is adjusted in this embodiment until closure of switch 1109 will result in a discharge behind the mass of particles 1105 whose presence reduces the breakdown voltage which must be applied between the needle 1112 and the barrel 1100 across which the pulsing source 1106 of the shock tube is connected.

When larger quantities of cunductive powder are supplied at 1105 in the region of needle 112, the breakdown voltage is reduced and rapid pulses can be generated so that a train of discharges, at a repetition frequency determined by the timer 1117 and synchronized with the particle-feed means, can drive these particles against the surface 1102. In general, the discharge takes place rearwardly of the particle mass 1105 and among these particles to partially ionize them trap their oxide films and effect direct transfer of kinetic energy to the particles in accordance with shock-wave principles. It will also be understood that the timer means need not be used inasmuch as closure of the switch 1109 will apply a given potential between the needle 1112 and the barrel 1100 so that firing of the discharge can be initiated either by advancing the needle 1112 or by introducing a sufficiently large mass of particles at 1105.

I claim:

1. A method of making a heat-exchanger member comprising the steps of:
    1. preparing a porous mass of thermally conductive particles monolithically bonded at their individual junctions; and
    2. fusing said porous mass to a thermally conductive metallic substrate, said substrate and said porous mass fused together forming a heat-transfer interface, said particles being fused together and to said substrate by:
        a. disposing a mass of the particles in a discrete noncoherent form between at least a pair of electrodes and in contact with said substrate;
        b. applying across said electrodes at least one impulsive electric current of a magnitude sufficient to fuse said particles together and to said substrate progressively with a succession of pulses; and
        c. compacting said particles against said substrate progressively while applying said succession of pulses.

2. The method defined in claim 1 wherein said porous mass is essentially free from blind pores.

3. The method defined in claim 1 wherein said substrate forms one of said electrodes.

4. The method defined in claim 1 further comprising the step of vibrating at least one of said electrodes toward and away from said substrate.

5. The method defined in claim 1 wherein said particles are fused togeher and to said substrate at least in part by the passage through said particles and said substrate of a high-frequency pulse current.

6. The method defined in claim 5 wherein said high-frequency pulse current is of a character sufficient to generate thermal energy predominantly at the contact regions between the particles and between the particles and the substrate.

7. The method defined in claim 5 wherein said pulse current has a frequency of substantially 1 to 10 MHz and an amplitude of substantially 0.1 to 100 kiloamperes.

8. The method defined in claim 7 wherein said particles are composed of a ferromagnetic material, further comprising the step of superimposing a direct current upon said pulse current.

9. The method defined in claim 1 wherein said particles are composed of a material selected from the group which consists of aluminum, copper, iron and nickel 10. The method defined in claim 1 wherein said particles are formed from discrete particles having a substantially spherical configuration.

11. The method defined in claim 1 wherein said particles are bonded together and against said substrate at least in part by a pressure pulse derived from a impulsive spark discharge in a fluid medium.

12. The method defined in claim 11 wherein substrate is a tube and is deformed concurrently with compaction of the particles thereagainst.

* * * * *